US011687910B2

(12) United States Patent
Kang et al.

(10) Patent No.: US 11,687,910 B2
(45) Date of Patent: Jun. 27, 2023

(54) RELAY ATTACK PREVENTION FOR ELECTRONIC QR CODES

(71) Applicant: PayPal, Inc., San Jose, CA (US)

(72) Inventors: Abraham Joseph Kang, Los Gatos, CA (US); Faisal M. Khan, Berkeley, CA (US); Bharat Chandra Penta, Bayonne, NJ (US); Vinh Nguyen, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 132 days.

(21) Appl. No.: 17/035,007

(22) Filed: Sep. 28, 2020

(65) Prior Publication Data

US 2022/0101304 A1    Mar. 31, 2022

(51) Int. Cl.
*G06Q 20/32*    (2012.01)
*G06K 19/06*    (2006.01)

(52) U.S. Cl.
CPC ... *G06Q 20/3274* (2013.01); *G06K 19/06037* (2013.01)

(58) Field of Classification Search
None
See application file for complete search history.

(56) References Cited

U.S. PATENT DOCUMENTS 10,902,414 B1 *  1/2021  Kurani ............... G06Q 20/3274
2012/0139835 A1 *  6/2012  Morrison ............ G06F 3/0425
                                                         345/157

(Continued)

FOREIGN PATENT DOCUMENTS

WO    2020172471 A1    8/2020

OTHER PUBLICATIONS

"Ladislav Karrach, Elena Pivarciova, and Pavol Bozek, Identification of QR Code Perspective Distortion Based on Edge Directions and Edge Projections Analysis, MDPI, p. 9-19, Jul. 2020." (Year: 2020).*

(Continued)

*Primary Examiner* — Kito R Robinson
*Assistant Examiner* — Toan Duc Bui
(74) *Attorney, Agent, or Firm* — Greenberg Traurig, LLP

(57) ABSTRACT

Systems and/or techniques for facilitating relay attack prevention for electronic quick response (QR) codes are provided. In various embodiments, a system can determine a cardinality and a frame rate. In various aspects, the system can transmit a first electronic instruction to a mobile device, which can cause the mobile device to generate a set of interlaced frames having the determined cardinality. In various cases, the set of interlaced frames can respectively correspond to a set of portions of an electronic QR code, such that different frames from the set of interlaced frames depict different portions from the set of portions of the electronic QR code. In various aspects, the first electronic instruction can further cause the mobile device to sequentially render, at the determined frame rate, the set of interlaced frames on an electronic display of the mobile device. In various aspects, this can cause one portion from the set of portions of the electronic QR code to be depicted on the electronic display at a time. In various instances, the system can transmit a second electronic instruction to a point-of-sale device, which can cause the point-of-sale device to reconfigure scanner settings of the point-of-sale device, and which can enable the point-of-sale device to capture the set of interlaced frames sequentially rendered on the electronic display of the mobile device based on the determined cardinality and the determined frame rate.

20 Claims, 20 Drawing Sheets

(56) References Cited

U.S. PATENT DOCUMENTS

| | | | |
|---|---|---|---|
| 2012/0188442 A1* | 7/2012 | Kennedy | G06T 1/0085 348/E7.003 |
| 2012/0211567 A1 | 8/2012 | Herzig | |
| 2013/0256403 A1* | 10/2013 | MacKinnon Keith | G06Q 20/20 235/375 |
| 2016/0104310 A1* | 4/2016 | Van Gorp | G06T 11/60 345/634 |
| 2016/0203468 A1* | 7/2016 | Chen | G06Q 20/385 705/75 |
| 2018/0039968 A1 | 2/2018 | Collinge et al. | |
| 2019/0034683 A1 | 1/2019 | Giordano et al. | |
| 2019/0147159 A1* | 5/2019 | Eisen | G06K 7/1417 726/17 |
| 2019/0230505 A1 | 7/2019 | Stimm et al. | |
| 2020/0240833 A1* | 7/2020 | Roy | G01H 9/00 |
| 2020/0279245 A1 | 9/2020 | Venkat et al. | |

OTHER PUBLICATIONS

International Search Report issued for PCT/US2021/051377, dated Dec. 16, 2021, 15 pgs.

\* cited by examiner

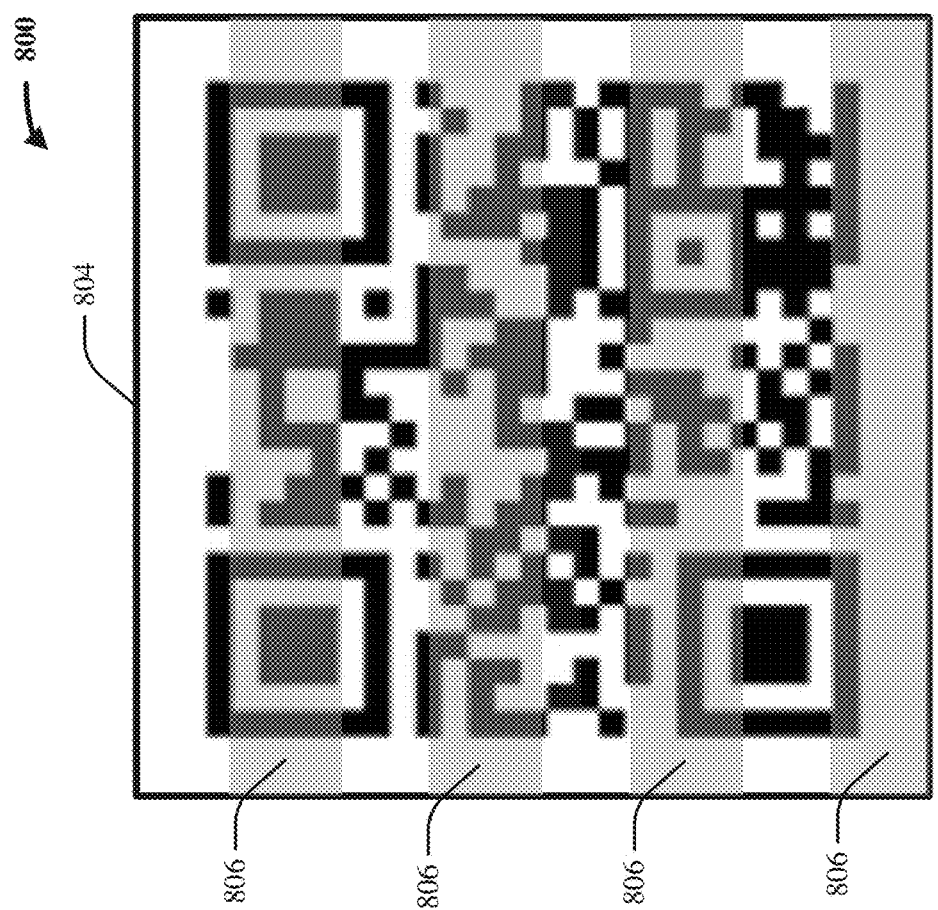
FIG. 8

RELAY ATTACK PREVENTION FOR ELECTRONIC QR CODES

TECHNICAL FIELD

The subject disclosure relates generally to electronic quick response (QR) codes, and more specifically to systems and/or techniques for facilitating relay attack prevention for electronic QR codes.

BACKGROUND

Electronic quick response (QR) codes can be leveraged to facilitate electronic payment transfers during commercial transactions. For instance, an electronic QR code can be correlated with and/or mapped to specific payment information (e.g., correlated with and/or mapped to a specific financial instrument). Accordingly, when a buyer procures a product and/or service from a seller, a smart device of the buyer can display/render an electronic QR code, a point-of-sale device of the seller can scan the electronic QR code as displayed by the smart device, and the point-of-sale device can transmit the scanned electronic QR code to a payment processor. The payment processor can then determine and/or identify the payment information that is correlated with the electronic QR code, and can transmit the payment information to a transaction settlement system for settlement (e.g., to actually facilitate the transfer of funds from an account associated with the buyer to an account associated with the seller).

However, electronic QR codes can be susceptible to relay attacks. A relay attack can involve an attacking device that impermissibly captures an image of the electronic QR code that is displayed by the smart device of the buyer. The attacking device can then display the captured image of the electronic QR code to the point-of-sale device. In this way, a user of the attacking device can use the electronic QR code to purchase, rent, and/or otherwise pay for products and/or services without the permission and/or authorization of the buyer. In such case, the buyer can be considered a victim of fraud (e.g., the user of the attacking device steals an electronic QR code of the buyer/victim and presents the stolen electronic QR code to a point-of-sale device in order to abscond with products and/or services).

Systems and/or techniques that can ameliorate one or more of these issues are desirable.

BRIEF DESCRIPTION OF THE DRAWINGS

FIG. 8 illustrates exemplary and non-limiting optical distortions that can manifest in the absence of refresh rate synchronization in accordance with one or more embodiments described herein.

DETAILED DESCRIPTION

Figure 1:
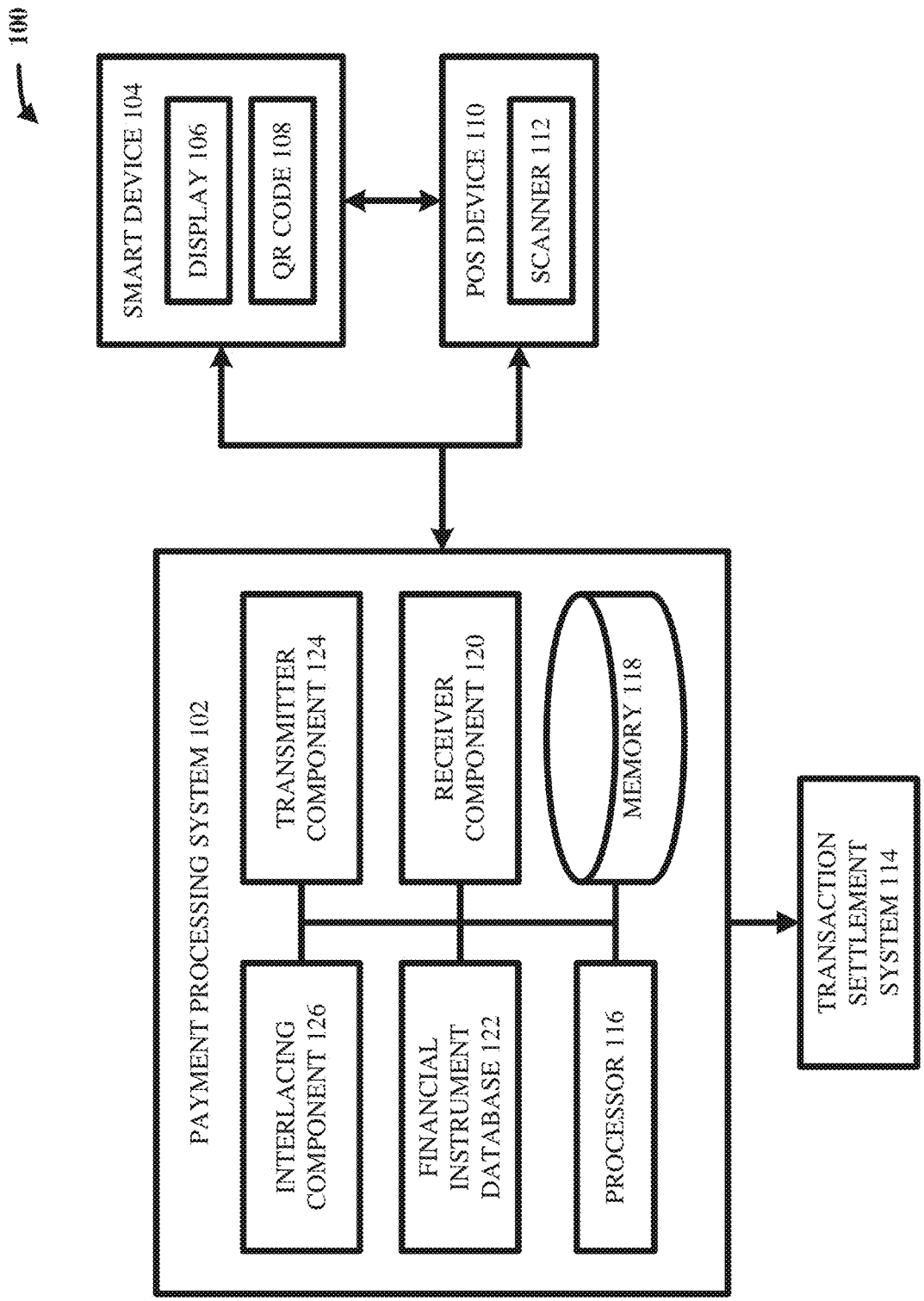
FIG. 1 illustrates a high-level block diagram of an example, non-limiting system that facilitates relay attack prevention for electronic QR codes via frame interlacing in accordance with one or more embodiments described herein.

The following detailed description is merely illustrative and is not intended to limit embodiments and/or application or uses of embodiments. Furthermore, there is no intention to be bound by any expressed or implied information presented in the preceding Background section, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In various aspects, an electronic quick response (QR) code can be an optical barcode (e.g., a machine-readable optical label and/or machine-readable optical image) that contains, represents, and/or indicates encoded information, and/or that is otherwise correlated/mapped to such encoded information. In various cases, any suitable cryptographic technique and/or any suitable encoding mode can be used to generate a QR code and/or to store, encrypt, encode, and/or embed information into a QR code, such as numeric, alphanumeric, byte/binary, and/or kanji. Once generated, a QR code can be displayed on any suitable electronic display (e.g., smart device screen, computer monitor, optical projector, hologram display) and/or can, in some cases, be printed and/or reproduced on any suitable tangible medium (e.g., printed on paper and/or cardboard). In various instances, a QR code, once generated and displayed, can visually appear to be a two-dimensional matrix and/or rectilinear grid of black and/or white squares, where the particular arrangement and/or pattern of the black and/or white squares in the matrix/grid can represent, indicate, and/or correspond to stored, encrypted, encoded, and/or embedded information. Although a QR code can be a two-dimensional matrix and/or rectilinear grid of black and/or white squares, this is exemplary and non-limiting. In some cases, a QR code can exhibit any suitable dimensionality (e.g., can be a one-dimensional barcode), can exhibit any suitable shape (e.g., can be circular, polygonal, slanted, irregular, and/or not necessarily rectilinear), and/or can exhibit any suitable colors and/or combinations of colors. In various aspects, the information stored, encoded, encrypted, and/or embedded within a QR code (and/or otherwise correlated and/or mapped to the QR code) can be extracted, read, processed, and/or interpreted by any suitable QR code scanner/reader (e.g., the QR code scanner/reader can capture an image of the QR code and/or can capture any other suitable optical characteristics of the QR code and can apply any suitable cryptographic technique to the scanned image and/or optical characteristics in order to decrypt the information that is stored, encrypted, encoded, and/or embedded within the QR code and/or otherwise correlated/mapped to the QR code).

In various aspects, electronic QR codes can be leveraged to facilitate electronic payment transfers during commercial transactions. For instance, suppose that a first entity (e.g., buyer, customer, consumer) is engaging in a transaction with a second entity (e.g., seller, merchant, vendor). In various aspects, an electronic QR code can be correlated with and/or mapped to specific payment information of the first entity (e.g., correlated with and/or mapped to a specific financial instrument of the buyer). Accordingly, when the first entity procures a product and/or service from the second entity, a smart device of the first entity can display/render the electronic QR code, a point-of-sale device of the second entity can scan the electronic QR code as displayed by the smart device, and the point-of-sale device can transmit the scanned electronic QR code to a payment processor. The payment processor can then determine and/or identify the payment information that is correlated with the electronic QR code, and can transmit the payment information to a transaction settlement system for settlement (e.g., to actually facilitate the transfer of funds from an account associated with the first entity to an account associated with the second entity).

However, when conventional systems and/or techniques are implemented, electronic QR codes can be vulnerable to relay attacks. A relay attack can involve an attacking device, operated by an attacking entity, that impermissibly captures an image of the electronic QR code that is displayed by the smart device of the first entity. The attacking device can then display the captured image of the electronic QR code to the point-of-sale device of the second entity. In this way, the attacking entity can use the electronic QR code of the first entity to purchase, rent, and/or otherwise pay for products and/or services provided by the second entity without the permission and/or authorization of the first entity. In such case, the first entity can be considered a victim of fraud (e.g., the attacking entity steals the electronic QR code of the first entity and presents the stolen electronic QR code to the point-of-sale device in order to abscond with products and/or services).

Various embodiments of the subject innovation can address one or more of these technical problems. Specifically, one or more embodiments described herein include systems, computer-implemented methods, apparatus, and/or computer program products that can facilitate relay attack prevention for electronic QR codes. In other words, various embodiments of the subject innovation can be considered as computerized systems and/or computer-implemented techniques that can help to safeguard electronic QR codes and/or that can reduce a risk associated with relay attacks (e.g., can reduce a probability of a relay attack being successfully completed). By reducing vulnerability to relay attacks, such computerized systems and/or computer-implemented techniques can thus improve security and/or privacy associated with electronic QR codes, and accordingly constitute concrete and tangible technique improvements in the field of electronic QR code generation.

Suppose that a first entity (e.g., buyer, customer, consumer) is transacting with (and/or is about to transact with) a second entity (e.g., seller, merchant, vendor). Furthermore, suppose that the first entity will pay for the transaction via an electronic QR code (e.g., the electronic QR code can be correlated with and/or mapped to payment information and/or financial instrument information of the first entity). In such case, the first entity can possess a smart device (e.g., a mobile phone, a tablet, a smart watch) that can visually render the electronic QR code on a display, monitor, and/or screen of the smart device. When conventional systems and/or techniques are implemented, the smart device displays the electronic QR code to a point-of-sale device of the second entity (e.g., a QR code scanner/reader) for scanning, the point-of-sale device transmits the scanned electronic QR code to a payment processor, the payment processor determines/identifies the payment information and/or financial instrument information that is correlated with and/or mapped to the electronic QR code, and the payment processor forwards the determined/identified payment information and/or financial instrument information to a transaction settlement system. However, as explained above, such conventional systems and/or techniques are vulnerable to relay attacks (e.g., an attacking device can capture an image of the electronic QR code as it is rendered on the display, monitor, and/or screen of the smart device, and the attacking device can subsequently present the captured image of the electronic QR code to a point-of-sale device without the permission and/or authorization of the first entity). As explained herein, various embodiments of the subject innovation can be implemented as any suitable combination of hardware and/or software in the payment processor and can enable the payment processor to exhibit functionality that reduces the risks associated with relay attacks (e.g., that makes it less likely for an attacking entity to successfully complete a relay attack). In other words, in various aspects, the payment processor can be considered as a trusted entity that can communicate with both the smart device and the point-of-sale device in order to reduce the likelihood of success associated with relay attacks.

Various embodiments of the subject innovation can facilitate relay attack prevention via frame interlacing. In various aspects, the point-of-sale device can be associated with an electronic beacon (e.g., a beacon at and/or near the point-of-sale device). In various cases, the smart device can receive a signal from the electronic beacon, which can inform the smart device of any suitable identification information associated with the point-of-sale device (e.g., the location of the point-of-sale device, a merchant identifier associated with the point-of-sale device, and/or so on). In various instances, the smart device can transmit an electronic message to the payment processor, which can include the identification information associated with the point-of-sale device as well as any suitable identification information associated with the smart device. In other words, the smart device can notify the payment processor that the smart device is transacting with and/or is about to transact with the point-of-sale device. In various cases, the payment processor can securely and/or privately determine a cardinality (e.g., a set count and/or a number of elements to be within a set) and/or a frame rate that will govern the transaction between the smart device and the point-of-sale device. In some aspects, the payment processor can determine the cardinality and/or the frame rate randomly (e.g., the payment processor can randomly select and/or identify a cardinality from a range of available and/or possible cardinalities; the payment processor can randomly select and/or identify a frame rate from a range of available and/or possible frame rates). In other aspects, the payment processor can determine the cardinality and/or the frame rate according to any suitable determination and/or identification scheme. Once the payment processor determines the cardinality and/or the frame rate that will govern the transaction, the payment processor can transmit an indication of the determined cardinality and/or the determined frame rate to both the smart device and the point-of-sale device. In response to receiving the indication of the determined cardinality, the smart device can, in some embodiments, decompose the electronic QR code into a set of QR code fragments, wherein the set of QR code fragments has the determined cardinality (e.g., wherein the number of fragments in the set of QR code fragments is equal to the determined cardinality). In various aspects, the smart device can generate a set of interlaced frames based on the set of QR code fragments, such that each frame in the set of interlaced frames depicts and/or illustrates a respectively corresponding fragment from the set of QR code fragments (e.g., different frames from the set of interlaced frames can depict different fragments from the set of QR code fragments). In response to receiving the indication of the determined frame rate, the smart device can, in various aspects, sequentially render, at the determined frame rate, the set of interlaced frames on its display, monitor, and/or screen for scanning by the point-of-sale device.

In various aspects, this sequential rendering can cause at most one frame from the set of interlaced frames to be rendered/displayed by the smart device at any given time. This can correspondingly cause at most one fragment from the set of QR code fragments to be rendered/displayed by the smart device at any given time. In various aspects, such sequential rendering of the set of interlaced frames can help to prevent a relay attack on the electronic QR code. In conventional systems/techniques, the entire electronic QR code would be rendered/depicted in a single frame on the display, monitor, and/or screen of the smart device, which allows an attacking device to capture the entire electronic QR code by capturing a single image of the display, monitor, and/or screen of the smart device. However, when frame interlacing is implemented as described herein according to various embodiments, no more than one fragment of the electronic QR code can be rendered/depicted on the display, monitor, and/or screen of the smart device at a time. So, when the attacking device steals/captures an image of the display, monitor, and/or screen of the smart device, the stolen/captured image depicts only a single fragment of the electronic QR code (e.g., the fragment that was rendered at the time of the image-capture by the attacking device) and does not depict the entire electronic QR code. Thus, sequential rendering of interlaced frames can help to prevent an attacking device from capturing the entirety of the electronic QR code. Without the entirety of the electronic QR code, the attacking device cannot use the electronic QR code to abscond with products/services. Thus, a risk associated with relay attacks can be reduced via frame interlacing.

In various instances, however, the point-of-sale device can nevertheless scan the entire electronic QR code. Specifically, in response to receiving the indication of the determined cardinality and/or the determined frame rate, the point-of-sale device can reconfigure its own scanner and/or image-capture settings according to the determined cardinality and/or the determined frame rate. In other words, because the point-of-sale device can know the determined cardinality and/or the determined frame rate, the point-of-sale device can know how to adjust/modulate its scanner settings so that it can scan/capture all of the set of the interlaced frames rather than scanning/capturing fewer than all of the set of interlaced frames (e.g., if the point-of-sale device knows that the fragments of the electronic QR code will be collectively rendered on the screen of the smart device in X consecutive frames at a frame rate of Y for any suitable numbers X and Y, the point-of-sale device can scan/capture all fragments of the electronic QR code by scanning/capturing at least X consecutive images with a shutter speed of Y). Because the attacking device is not informed of the determined cardinality and/or the determined frame rate, the attacking device cannot easily capture all of the set of interlaced frames, unlike the point-of-sale device.

After scanning the set of interlaced frames, the point-of-sale device can transmit the set of interlaced frames to the payment processor, the payment processor can construct and/or assemble the entire electronic QR code based on the set of interlaced frames (e.g., by superimposing the set of interlaced frames on top of each other, and/or by otherwise stitching together the different fragments of the electronic QR code), and the payment processor can determine and/or identify the payment information that corresponds to the electronic QR code. In various cases, the payment processor can transmit the payment information to the transaction settlement system for settlement.

To help clarify some of the above discussion, consider the following non-limiting example. Suppose that the payment processor determines a cardinality of 5 and a frame rate of 87 Hertz (Hz). In such case, the payment processor can inform both the smart device and the point-of-sale device that the cardinality governing the transaction is 5 and that the frame rate governing the transaction is 87 Hz. Accordingly, the smart device can physically/spatially decompose and/or fracture the electronic QR code into 5 different fragments/portions (e.g., a central fragment, an upper left fragment, an upper right fragment, a lower left fragment, and a lower right fragment). Moreover, the smart device can generate a set of 5 interlaced frames, with each frame depicting a different and/or respectively corresponding one of the 5 fragments. For instance, a first frame can depict the central fragment, a second frame can depict the upper left fragment, a third frame can depict the upper right fragment, a fourth frame can depict the lower left fragment, and a fifth frame can depict the lower right fragment. Furthermore, the smart device can continuously and/or sequentially render the set of 5 interlaced frames on its display, monitor, and/or screen at a frame rate of 87 Hz (e.g., can render the first frame for a duration of $\frac{1}{87}$ of a second, then the second frame for a duration of $\frac{1}{87}$ of a second, then the third frame for a duration of $\frac{1}{87}$ of a second, then the fourth frame for a duration of $\frac{1}{87}$ of a second, then the fifth frame for a duration of $\frac{1}{87}$ of a second, and can then loop back to the first frame for a duration of $\frac{1}{87}$ of a second, and/or so on). In various cases, the point-of-sale device can know that the set of 5 interlaced frames can be scanned by scanning at least 5 consecutive images at a shutter speed of 87 Hz (e.g., by scanning/capturing an image of the display, monitor, and/or screen of the smart device every $\frac{1}{87}$ of a second). If the attacking device captures only a single image of the display, monitor, and/or screen of the smart device, the attacking device obtains only a single fragment of the 5 different fragments of the electronic QR code. Moreover, since the attacking device does not know the determined cardinality and/or the determined frame rate, the attacking device cannot easily capture the entirety of the electronic QR code, unlike the point-of-sale device. Thus, in various aspects, frame interlacing can prevent (and/or at least impede) the attacking device from capturing the entirety of the electronic QR code. In other words, frame interlacing can help to reduce risks associated with relay attacks.

Various embodiments of the subject innovation can facilitate relay attack prevention via refresh rate synchronization. As mentioned above, in various aspects, the point-of-sale device can be associated with an electronic beacon, which can inform and/or notify the smart device of identification information associated with the point-of-sale device. As also mentioned above, in various instances, the smart device can transmit an electronic message to the payment processor, which can notify the payment processor that the smart device is transacting with and/or is about to transact with the point-of-sale device. In various embodiments, the payment processor can securely and/or privately determine a frequency value (e.g., a refresh rate value and/or a shutter speed value) that will govern the transaction between the smart device and the point-of-sale device. In some aspects, the payment processor can determine the frequency value randomly (e.g., the payment processor can randomly select and/or identify a frequency value from a range of available and/or possible frequency values). In other aspects, the payment processor can determine the frequency value according to any suitable determination and/or identification scheme. Once the payment processor determines the frequency value that will govern the transaction, the payment processor can securely transmit an indication of the determined frequency value to both the smart device and the point-of-sale device. In response to receiving the indication of the determined frequency value, the smart device can, in some embodiments, adjust/modulate its refresh rate based on the determined frequency value (e.g., the smart device can cause its refresh rate to become equal to the determined frequency value). The smart device can then render the electronic QR code on its display, monitor, and/or screen according to the adjusted refresh rate. In response to receiving the indication of the determined frequency value, the point-of-sale device can, in various cases, adjust/modulate its shutter speed based on the determined frequency value (e.g., the point-of-sale device can cause its shutter speed to become equal to the determined frequency value). In various aspects, the point-of-sale device can then scan the display, monitor, and/or screen of the smart device in order to scan/capture an image of the electronic QR code according to the adjusted shutter speed. In various instances, the point-of-sale device can transmit the scanned image of the electronic QR code to the payment processor.

In various cases, the payment processor can analyze, via a trained machine learning classifier, the scanned image of the electronic QR code to determine whether or not the scanned image is involved in a relay attack. As explained, both the refresh rate of the smart device and the shutter speed of the point-of-sale device can, in some cases, be equal to the determined frequency value. In such cases, the refresh rate and the shutter speed can be considered as synchronized. When the refresh rate of the smart device is not synchronized with the shutter speed of the point-of-sale device (e.g., when the refresh rate is not equal to the shutter speed and/or is not a whole multiple/factor of the shutter speed), the image of the electronic QR code that is scanned/captured by the point-of-sale device can have and/or exhibit various optical distortions and/or imaging artifacts (e.g., the scanned/captured image can include various shaded bars, shadows, and/or flickers that are superimposed over the electronic QR code). However, when the refresh rate of the smart device is synchronized with the shutter speed of the point-of-sale device (e.g., when the refresh rate is equal to the shutter speed and/or is a whole multiple/factor of the shutter speed), the image of the electronic QR code that is scanned/captured by the point-of-sale device can lack such optical distortions and/or imaging artifacts. In various instances, the payment processor can feed the scanned image of the electronic QR code to a trained machine learning model (e.g., a pattern recognition and/or image recognition algorithm) that is configured to detect the presence of such optical distortions and/or imaging artifacts. If no optical distortions and/or imaging artifacts are detected in the scanned image of the electronic QR code, it can be determined and/or inferred that the electronic QR code is not involved in a relay attack. On the other hand, if optical distortions and/or imaging artifacts are detected in the scanned image of the electronic QR code, it can be determined and/or inferred that the electronic QR code is involved in a relay attack. After all, the payment processor, in some cases, informs both the smart device and the point-of-sale device of the determined frequency value so that the refresh rate of the smart device and the shutter speed of the point-of-sale device can become synchronized. Thus, if the point-of-sale device scans the display, monitor, and/or screen of the smart device, no optical distortions and/or imaging artifacts will result due to the synchronization. However, if the point-of-sale device instead scans the display, monitor, and/or screen of an attacking device that has stolen the electronic QR code, optical distortions and/or imaging artifacts are likely to result due to the high probability that the refresh rate of the attacking device is not synchronized with the shutter speed of the point-of-sale device (e.g., the attacking device is not notified of the determined frequency value, and thus it cannot reliably synchronize its refresh rate with the shutter speed of the point-of-sale device). In this way, refresh rate synchronization can be used to detect and/or ferret out relay attacks.

If the trained machine learning model determines that the scanned image of the electronic QR code does not contain optical distortions and/or imaging artifacts that are indicative of non-synchronization, the payment processor can infer that the electronic QR code is not involved in a relay attack (e.g., can infer that the point-of-sale device scanned a genuine rendition of the electronic QR code). Accordingly, the payment processor can identify and/or determine the payment information that corresponds to the electronic QR code and can transmit the payment information to the transaction settlement system for settlement. In contrast, if the trained machine learning model determines that the scanned image of the electronic QR code contains optical distortions and/or imaging artifacts that are indicative of non-synchronization, the payment processor can infer that the electronic QR code is involved in a relay attack (e.g., can infer that the point-of-sale device scanned a non-genuine and/or relayed copy of the electronic QR code). Accordingly, the payment processor can refrain from identifying and/or determining the payment information that corresponds to the electronic QR code, and can refrain from transmitting the payment information to the transaction settlement system for settlement, and/or can send an unsuccessful validation/verification message to the point-of-sale device.

To help clarify some of the above discussion, consider the following non-limiting example. Suppose that the payment processor determines a frequency value of 109 Hz. In such case, the payment processor can inform both the smart device and the point-of-sale device that the frequency value governing the transaction is 109 Hz. Accordingly, the smart device can modulate/adjust its refresh rate to be equal to 109 Hz. Similarly, the point-of-sale device can modulate/adjust its shutter speed to be equal to 109 Hz. If the point-of-sale device scans the display, monitor, and/or screen of the smart device, the point-of-sale device can obtain a scanned image of the electronic QR code that lacks optical distortions and/or imaging artifacts that are indicative of non-synchronization (e.g., since the refresh rate of the smart device is synchronized with the shutter speed of the point-of-sale device, optical distortions can fail to form in the scanned image of the electronic QR code). On the other hand, if the point-of-sale device scans the display, monitor, and/or screen of an attacking device, the point-of-sale device can obtain a scanned image of the electronic QR code that possesses optical distortions and/or imaging artifacts that are indicative of non-synchronization (e.g., since the refresh rate of the attacking device is likely not synchronized with the shutter speed of the point-of-sale device, optical distortions can form in the scanned image of the electronic QR code). Accordingly, in various aspects, the payment processor can receive a scanned image of the electronic QR code from the point-of-sale device and can analyze the scanned image as described above by executing a machine learning classifier that is trained to detect optical distortions and/or imaging artifacts that are indicative of non-synchronization. If such optical distortions are detected, the payment processor can notify the point-of-sale device that the electronic QR code is involved in a relay attack (e.g., can infer and/or determine that the point-of-sale device scanned an attacking device rather than the genuine smart device). Instead, if such optical distortions are not detected, the payment processor can infer that the electronic QR code is not involved in a relay attack (e.g., can infer and/or determine that the point-of-sale device scanned the genuine smart device rather than an attacking device), can transmit a successful validation message to the point-of-sale device, and can transmit payment information corresponding to the electronic QR code to the transaction settlement system. Thus, in various aspects, refresh rate synchronization can prevent (and/or at least impede) the attacking device from completing a relay attack. In other words, refresh rate synchronization can help to reduce risks associated with relay attacks.

Various other embodiments of the subject innovation can facilitate relay attack prevention by various other techniques. For instance, some embodiments can facilitate relay attack prevention via QR code alignment detection. In such cases, the point-of-sale device can scan the smart device (and/or an attacking device) such that the scanned image depicts not only the electronic QR code but also the edges and/or bevels of the smart device (and/or of the attacking device). In various aspects, after receiving the scanned image of the electronic QR code from the point-of-sale device, the payment processor can feed the scanned image to a trained machine learning model that is configured to determine whether the edges of the electronic QR code are properly aligned with the edges and/or bevels of the smart device (and/or of the attacking device). That is, the machine learning model can, in various instances, be trained to segment the edges/bevels of the device being scanned by the point-of-sale device (e.g., either the smart device or an attacking device) and to segment the edges of the electronic QR code that is rendered by the device being scanned by the point-of-sale device. The machine learning model can then compare the segmented edges/bevels of the device being scanned with the edges of the electronic QR code to determine whether they are physically aligned and/or parallel. If they are physically aligned and/or parallel, the machine learning model can determine and/or infer that the electronic QR code is not involved in a relay attack (e.g., can infer that the point-of-sale device scanned the genuine smart device and not the attacking device). On the hand, if they are not physically aligned and/or parallel, the machine learning model can determine and/or infer that the electronic QR code is involved in a relay attack (e.g., can infer that the point-of-sale device scanned the attacking device and not the genuine smart device). Based on this determination, the payment processor can either transmit payment information corresponding to the electronic QR code to the transaction settlement system and/or can refrain from doing so. For example, when no relay attack is attempted, the smart device can render/depict the electronic QR code on its display, monitor, and/or screen such that the edges of the electronic QR code are physically aligned and/or parallel with the edges/bevels of the smart device. In contrast, when an attacking device attempts an inconspicuous relay attack, the attacking device often captures an angled image of the electronic QR code as rendered/depicted on the display, monitor, and/or screen of the smart device. Due to this angle of image capture, the edges of the electronic QR code can be not aligned/parallel with the edges/bevels of the attacking device when the attacking device renders/depicts the electronic QR code on a display, monitor, and/or screen of the attacking device. Therefore, in various cases, a machine learning algorithm can be trained to detect such misalignment in order to distinguish between genuine and relayed QR codes.

As another example, some embodiments of the subject innovation can facilitate relay attack prevention via finger detection. In such cases, the point-of-sale device can scan the smart device (and/or an attacking device) such that the scanned image depicts not only the electronic QR code but also the edges and/or bevels of the smart device (and/or of the attacking device). In various aspects, after receiving the scanned image of the electronic QR code from the point-of-sale device, the payment processor can feed the scanned image to a trained machine learning model that is configured to determine whether the scanned image depicts human fingers (and/or any other suitable anatomical structures) both inside and outside of the edges/bevels of the smart device (and/or of the attacking device). That is, the machine learning model can, in various instances, be trained to segment in the scanned image the edges/bevels of the device being scanned by the point-of-sale device and to segment in the scanned image depicted human fingers. The machine learning model can then determine whether the segmented fingers are present outside of and/or inside of the segmented edges/bevels of the device being scanned. If segmented fingers are not both inside and outside of the segmented edges/bevels, the machine learning model can determine and/or infer that the electronic QR code is not involved in a relay attack (e.g., can infer that the point-of-sale device scanned the genuine smart device and not the attacking device). On the hand, if segmented fingers are both inside and outside of the segmented edges/bevels, the machine learning model can determine and/or infer that the electronic QR code is involved in a relay attack (e.g., can infer that the point-of-sale device scanned the attacking device and not the genuine smart device). Based on this determination, the payment processor can either transmit payment information corresponding to the electronic QR code to the transaction settlement system and/or can refrain from doing so. For example, when no relay attack is attempted, the smart device can render/depict the electronic QR code on its display, monitor, and/or screen such that only the electronic QR code is depicted as being inside of the edges/bevels of the smart device (e.g., the first entity can hold the smart device such that his/her fingers are not on the display, monitor, and/or screen of the smart device, and the smart device can refrain from rendering images of fingers when rendering the electronic QR code). In contrast, when an attacking device attempts an inconspicuous relay attack, the attacking device often captures fingers of the first entity in addition to the electronic QR code as rendered/depicted on the display, monitor, and/or screen of the smart device. Accordingly, when the attacking device renders the electronic QR code on its own display, monitor, and/or screen for scanning by the point-of-sale device, the attacking device will render both the electronic QR code and the fingers of the first entity. Therefore, in various cases, a machine learning algorithm can be trained to detect such excess fingers in order to distinguish between genuine and relayed QR codes.

As yet another example, some embodiments of the subject innovation can facilitate relay attack prevention via background detection. In such cases, the point-of-sale device can scan the smart device (and/or an attacking device) such that the scanned image depicts not only the electronic QR code but also the entire display, monitor, and/or screen of the smart device (and/or of the attacking device). In various aspects, after receiving the scanned image of the electronic QR code from the point-of-sale device, the payment processor can feed the scanned image to a trained machine learning model that is configured to determine whether the scanned image depicts a predetermined background object and/or pattern (e.g., paisley) behind the electronic QR code. That is, the machine learning model can, in various instances, be trained to segment the electronic QR code and to detect the predetermined background object and/or pattern in the scanned image. If the predetermined background object/pattern is detected, the machine learning model can determine and/or infer that the electronic QR code is not involved in a relay attack (e.g., can infer that the point-of-sale device scanned the genuine smart device and not the attacking device). On the hand, if the predetermined background object/pattern is not detected, the machine learning model can determine and/or infer that the electronic QR code is involved in a relay attack (e.g., can infer that the point-of-sale device scanned the attacking device and not the genuine smart device). Based on this determination, the payment processor can either transmit payment information corresponding to the electronic QR code to the transaction settlement system and/or can refrain from doing so. For example, when no relay attack is attempted, the smart device can render/depict the electronic QR code on its display, monitor, and/or screen such that the electronic QR code is depicted as being inside of the edges/bevels of the smart device and that an unbroken paisley background is depicted as being between the electronic QR code and the edges/bevels of the smart device. In contrast, when an attacking device attempts an inconspicuous relay attack, the attacking device often captures various other background objects in addition to the electronic QR code and the paisley background as rendered/depicted on the display, monitor, and/or screen of the smart device (e.g., can capture the first entity's clothing, the floor, the wall, furniture, and/or so on). Accordingly, when the attacking device renders the electronic QR code on its own display, monitor, and/or screen for scanning by the point-of-sale device, the attacking device will render the electronic QR code, the paisley background, and the various other background objects. Because the various other background objects are not equivalent to the predetermined unbroken paisley background, a machine learning algorithm can be trained to detect such dissimilarities in order to distinguish between genuine and relayed QR codes.

Overall, various embodiments of the subject innovation can help to prevent and/or impede relay attacks on electronic QR codes. Some embodiments can accomplish this via frame interlacing (e.g., a smart device can be configured to not render an entire electronic QR code at once and/or in a single frame; instead, the smart device can sequentially render a plurality of frames, each depicting a different fragment/portion of the electronic QR code; when an attacking device tries to capture the electronic QR code, it can capture at most only a fragment/portion of the electronic QR code). Some embodiments can accomplish this via refresh rate synchronization (e.g., the shutter speed of a point-of-sale device can be synchronized with the refresh rate of a smart device and can be not synchronized with the refresh rate of an attacking device; if the point-of-sale device scans the smart device, the scanned image can contain no artifacts; if the point-of-sale device scans the attacking device, the scanned image can contain artifacts; such artifacts can be detected to distinguish between relayed and genuine QR codes). Some embodiments can accomplish this via other types of techniques (e.g., alignment detection, finger detection, background detection, and/or so on).

Various embodiments of the subject innovation can be employed to use hardware and/or software to solve problems that are highly technical in nature (e.g., to facilitate relay attack prevention for electronic QR codes), that are not abstract and that cannot be performed as a set of mental acts by a human. Further, some of the processes performed can be performed by a specialized computer (e.g., trained machine learning models, QR code scanner/reader, electronic display/monitor/screen) for carrying out defined tasks related to relay attack prevention (e.g., causing a smart device to decompose an electronic QR code into a plurality of fragments and to generate a plurality of interlaced frames corresponding to the plurality of fragments; causing the smart device to sequentially render the plurality of interlaced frames on an electronic display; causing a smart device to synchronize its refresh rate with a shutter speed of a point-of-sale device; executing a machine learning algorithm that is trained to detect optical distortions/artifacts in a scanned image of an electronic QR code; executing a machine learning algorithm that is trained to detect QR code alignment in a scanned image of an electronic QR code; executing a machine learning algorithm that is trained to detect fingers depicted in a scanned image of an electronic QR code; executing a machine learning algorithm that is trained to detect predetermined background objects/patterns in a scanned image of an electronic QR code; and/or so on). Such defined tasks are not conventionally performed manually by humans. Indeed, neither the human mind nor a human with pen and paper can transmit and/or receive electronic commands/instructions, can decompose an electronic QR code into a plurality of QR code fragments, can generate a plurality of interlaced frames respectively corresponding to the plurality of QR code fragments, can sequentially render the plurality of interlaced frames on an electronic display, can synchronize the refresh rate of a smart device with the shutter speed of a point-of-sale device, can execute a trained machine learning model to detect imaging artifacts indicative of non-synchronization, can execute a trained machine learning model to detect QR code misalignment in a scanned image of an electronic QR code, can execute a trained machine learning model to detect excess fingers in a scanned image of an electronic QR code, can execute a trained machine learning model to detect predefined background objects in a scanned image of an electronic QR code, and/or so on. Instead, various embodiments of the subject innovation are inherently and inextricably tied to computer technology and cannot be implemented outside of a computing environment (e.g., trained machine learning models cannot exist outside of a computing environment, refresh rates of electronic displays and shutter speeds of image capture device cannot exist outside of a computing environment, and/or so on).

In various instances, embodiments of the subject innovation can integrate into a practical application the disclosed teachings regarding relay attack prevention for electronic QR codes. Indeed, in various embodiments, the disclosed teachings can provide computerized systems and/or computer-implemented techniques that can enable a payment processor to exhibit specific functionality that prevents and/or impedes relay attacks. As explained above, a relay attack occurs when an attacking entity steals an electronic QR code from a victim and subsequently uses the stolen electronic QR code to abscond with products/services. In various cases, the attacking entity generally performs such relay attack by capturing an image of the electronic QR code of the victim without consent. Various embodiments of the subject innovation can be implemented to prevent, impede, and/or detect such capture of electronic QR codes. Specifically, various embodiments can implement frame interlacing to prevent/impede relay attacks (e.g., rendering an electronic QR code in a set of interlaced frames rather than in a single frame can make it more difficult for an attacking device to capture the electronic QR code), various embodiments can implement refresh rate synchronization to prevent/impede relay attacks (e.g., a scanned image of an electronic QR code can contain detectable anomalies and/or artifacts when the refresh rate of the displaying device is not synchronized with the shutter speed of the point-of-sale device), various embodiments can implement various other techniques to prevent/impede relay attacks (e.g., alignment detection, finger detection, and/or background detection), and/or so on. Such computerized systems and/or techniques that can prevent and/or impede relay attacks (e.g., fraud) certainly constitute a useful and/or practical application of computers.

Moreover, such computerized systems and/or techniques can solve various technical problems in the field of electronic QR code generation. Specifically, as mentioned above, conventional systems/techniques are highly vulnerable to relay attacks, in which an attacking device can steal an electronic QR code by discretely and/or inconspicuously capturing an image of the electronic QR code of a victim and subsequently presenting that captured image to a point-of-sale device. However, various embodiments of the subject innovation, as explained herein, can help to protect electronic QR codes from relay attacks. Specifically, frame interlacing can involve rendering one fragment/portion of an electronic QR code at a time (e.g., in separate frames) rather than rendering the entire electronic QR code at once (e.g., in a single frame); this can prevent an attacker from capturing the entire electronic QR code in a captured image. In various aspects, refresh rate synchronization can involve synchronizing the refresh rate of a smart device with the shutter speed of a point-of-sale device such that no optical distortions/artifacts form in a scanned image of the electronic QR code when no relay attack is involved; since the refresh rate of an attacking device is likely to not be synchronized with the shutter speed of the point-of-sale device, detectable optical distortions/artifacts can form in a scanned image of the electronic QR code when a relay attack is involved. In various other instances, different computer vision techniques can be implemented to ferret out relayed QR codes (e.g., QR code misalignment detection, excess finger detection, predefined background detection, and/or so on). In various aspects, these specific embodiments can help to prevent and/or impede relay attacks (e.g., can help to prevent and/or impede fraud), against which conventional systems/techniques simply do not protect. For at least these reasons, various embodiments of the subject innovation constitute a concrete and tangible technical improvement in the field of electronic QR code generation.

It should be appreciated that the herein figures are exemplary and non-limiting.

FIG. 1 illustrates a high-level block diagram of an example, non-limiting system 100 that can facilitate relay attack prevention for electronic QR codes via frame interlacing in accordance with one or more embodiments described herein. As shown, in various aspects, a payment processing system 102 can have any suitable form of electronic communication (e.g., wired and/or wireless) with a smart device 104 and/or with a point-of-sale device 110 (referred to as POS device 110 in the figures and description for sake of space).

In various embodiments, the smart device 104 can be any suitable computing device, such as a mobile phone, a tablet, a smart watch, a laptop computer, and/or so on. In various aspects, the smart device 104 can have a display 106, which can be any suitable electronic screen and/or electronic monitor for visually rendering and/or depicting information. In various aspects, the smart device 104 can electronically store and/or maintain a QR code 108, which can be any suitable optical barcode that represents and/or is correlated to particular information. In various instances, the smart device 104 can be associated with and/or used by a first entity (e.g., buyer, customer, consumer), and the QR code 108 can represent and/or be correlated with payment information of the first entity (e.g., can be mapped to a financial instrument of the first entity).

In various embodiments, the POS device 110 can be any suitable point-of-sale apparatus that has a scanner 112. In various aspects, the scanner 112 can be any suitable type of image-capture, video-capture, and/or laser-scanning mechanism that can detect and/or record optical information (e.g., that can detect, scan, record, and/or capture optical barcodes). In various cases, the POS device 110 can be associated with and/or used by a second entity (e.g., seller, merchant, vendor). In various aspects, the first entity can engage in a transaction with the second entity in order to procure a product/service. To pay for such transaction, the smart device 104 can visually render the QR code 108 (e.g., which can represent the payment information of the first entity) on the display 106, and the first entity can physically present the smart device 104 to the POS device 110 such that the display 106 is scannable by the scanner 112. In various aspects, the scanner 112 can scan the display 106 so as to capture and/or obtain the QR code 108 (e.g., to generate and/or obtain a scanned image of the QR code 108).

In various aspects, the POS device 110 can transmit the QR code 108 (e.g., can transmit the scanned image of the QR code 108) to the payment processing system 102 for various processing (described further below), and the payment processing system 102 can, in various cases, determine the payment information that corresponds to the QR code 108 and forward the payment information to a transaction settlement system 114 for settlement. In various instances, the transaction settlement system 114 can be any suitable combination of servers and/or databases (e.g., whether centralized and/or distributed) that can leverage the payment information corresponding to the QR code 108 in order to actually facilitate the electronic transfer of funds from an account associated with the first entity to an account associated with the second entity.

As explained above, the QR code 108 can, in some cases, be vulnerable and/or susceptible to a relay attack. For instance, a relay attack can occur if an attacking device (not shown in the figures) impermissibly captures an image of the display 106 while the QR code 108 is visually rendered on the display 106. In such case, the attacking device has stolen the QR code 108. In various cases, the attacking device can subsequently visually render the stolen/relayed copy of the QR code 108 on its own electronic screen and can present the stolen/relayed copy of the QR code 108 to the POS device 110 for scanning. The POS device 110 can transmit the scanned image of the stolen/relayed copy of the QR code 108 to the payment processing system 102. If the payment processing system 102 is unable to distinguish between scans of genuine versions of the QR code 108 and scans of stolen/relayed versions of the QR code 108, the user of the attacking device could abscond with products/services provided by the second entity without properly paying for them (e.g., by fraudulently using the payment information of the first entity).

In various embodiments, as described below, the payment processing system 102 can perform various functionalities that can help to prevent and/or impede the risk of relay attacks with respect to the QR code 108.

In various embodiments, the payment processing system 102 can comprise a processor 116 (e.g., computer processing unit, microprocessor) and a computer-readable memory 118 that is operably and/or operatively and/or communicatively connected/coupled to the processor 116. The memory 118 can store computer-executable instructions which, upon execution by the processor 116, can cause the processor 116 and/or other components of the payment processing system 102 (e.g., receiver component 120, financial instrument database 122, transmitter component 124, interlacing component 126) to perform one or more acts. In various embodiments, the memory 118 can store computer-executable components (e.g., receiver component 120, financial instrument database 122, transmitter component 124, interlacing component 126), and the processor 116 can execute the computer-executable components.

In various embodiments, the payment processing system 102 can comprise a receiver component 120. In various aspects, the receiver component 120 can be any suitable electronic and/or telecommunications apparatus that can receive electronic transmissions, messages, instructions, and/or notifications from the smart device 104 and/or from the POS device 110. In some cases, the receiver component 120 can receive a scanned image of the QR code 108 from the POS device 110.

In various embodiments, the payment processing system 102 can comprise a financial instrument database 122. In various aspects, the financial instrument database 122 can be any suitable centralized and/or distributed data structure (e.g., graph database, relational database, hybrid database) that can electronically store and/or maintain payment information (e.g., financial instrument identifiers such as credit card numbers, bank account numbers, and/or so on). In various aspects, after receiving the scanned image of the QR code 108, the payment processing system 102 can identify payment information within the financial instrument database 122 that corresponds to and/or is correlated with the QR code 108.

In various embodiments, the payment processing system 102 can comprise a transmitter component 124. In various aspects, the transmitter component 124 can be any suitable electronic and/or telecommunications apparatus that can transmit electronic transmissions, messages, instructions, and/or notifications to the smart device 104, to the POS device 110, and/or to the transaction settlement system 114. In some cases, the transmitter component 124 can transmit the payment information that corresponds to and/or is correlated with the QR code 108 to the transaction settlement system 114 for settlement of the transaction between the first entity and the second entity.

In various embodiments, the payment processing system 102 can comprise an interlacing component 126. In various aspects, the interlacing component 126 can provide some functionality that can help to prevent and/or impede relay attacks on the QR code 108, as explained below. In various instances, before the display 106 of the smart device 104 is presented to the scanner 112 of the POS device 110 for scanning, the smart device 104 can receive information from an electronic beacon (not shown in the figures) that is associated with the POS device 110. In various cases, the electronic beacon can wirelessly transmit to the smart device 104 any suitable identification information associated with the POS device 110 (e.g., location of the POS device 110, merchant identifier of the POS device 110, device identifier of the POS device 110, and/or so on). In other words, the electronic beacon can inform/notify the smart device 104 of the identity of the POS device 110. In various aspects, the smart device 104 can transmit to the receiver component 120 an electronic message that includes the identification information of the POS device 110, that includes any suitable identification information associated with the smart device 104, and/or that indicates that the smart device 104 is transacting with and/or is about to transact with the POS device 110. Based on this electronic message from the smart device 104, the interlacing component 126 can determine particular security parameters that will govern the transaction between the smart device 104 and the POS device 110 and that will help to prevent and/or impede relay attacks on the QR code 108. Specifically, the interlacing component 126 can determine and/or identity a cardinality and/or a frame rate, which can be leveraged to increase the security of the QR code 108. In various instances, the transmitter component 124 can transmit the determined cardinality and the determined frame rate to both the smart device 104 and the POS device 110.

In response to receiving the determined cardinality, the smart device 104 can decompose the QR code 108 into a set of QR code portions (e.g., QR code fragments and/or QR code pieces) and can electronically generate a set of interlaced frames that respectively correspond to the set of QR code portions. That is, in various aspects, each frame from the set of interlaced frames can depict, illustrate, and/or include a respectively corresponding portion from the set of QR code portions (e.g., different frames can depict different portions of the QR code 108). In response to receiving the determined frame rate, the smart device 104 can visually render, in a looped, sequential, and/or consecutive fashion, the set of interlaced frames on the display 106 at the determined frame rate. Note that, in various aspects, such visual rendition of the set of interlaced frames can help to prevent and/or impede relay attacks on the QR code 108. After all, since each frame of the set of the interlaced frames depicts a different portion of the QR code 108, no frame of the set of interlaced frames depicts the entire QR code 108. Thus, if an attacking device impermissibly captures an image of the display 106 while the display 106 is visually rendering in looped fashion the set of interlaced frames, the captured image can depict at most one portion of the QR code 108 (e.g., the portion that was rendered on the display 106 at the time of the image capture by the attacking device) and cannot depict the entirety of the QR code 108. Thus, frame interlacing in this way can make it more difficult for an attacking entity to capture an entirety of the QR code 108, which can help to prevent and/or impede relay attacks.

In response to receiving the determined cardinality and/or the determined frame rate, the POS device 110 can alter, adjust, modulate, and/or reconfigure settings of the scanner 112 so that the scanner 112 can scan/capture the set of interlaced frames rendered on the display 106. In other words, the attacking device cannot easily capture an entirety of the QR code 108 because the attacking device does not know the determined cardinality and/or the determined frame rate; however, the POS device 110 can easily scan/capture the set of interlaced frames because the POS device knows the determined cardinality and the determined frame rate. Specifically, in some cases, the POS device 110 can scan/capture all of the set of interlaced frames by adjusting a shutter speed of the scanner 112 to be equal to the determined frame rate and by scanning/capturing a number of images of the display 106 at the adjusted shutter speed, wherein the number of images is equal to the determined cardinality. In such case, the POS device 110 can have scanned/captured all frames in the set of interlaced frames.

In various aspects, the POS device 110 can transmit the set of interlaced frames to the receiver component 120. In various instances, the payment processing system 102 can construct and/or assemble an entirely of the QR code 108 by superimposing the set of interlaced frames on top of each other, and/or by otherwise stitching together the set of QR code portions in any suitable fashion. In various aspects, once the entirety of the QR code 108 is known to the payment processing system 102, the payment processing system 102 can determine and/or identify the payment information corresponding to the QR code 108 (e.g., via the financial instrument database 122), and the transmitter component 124 can transmit the determined/identified payment information to the transaction settlement system 114.

Figure 2:
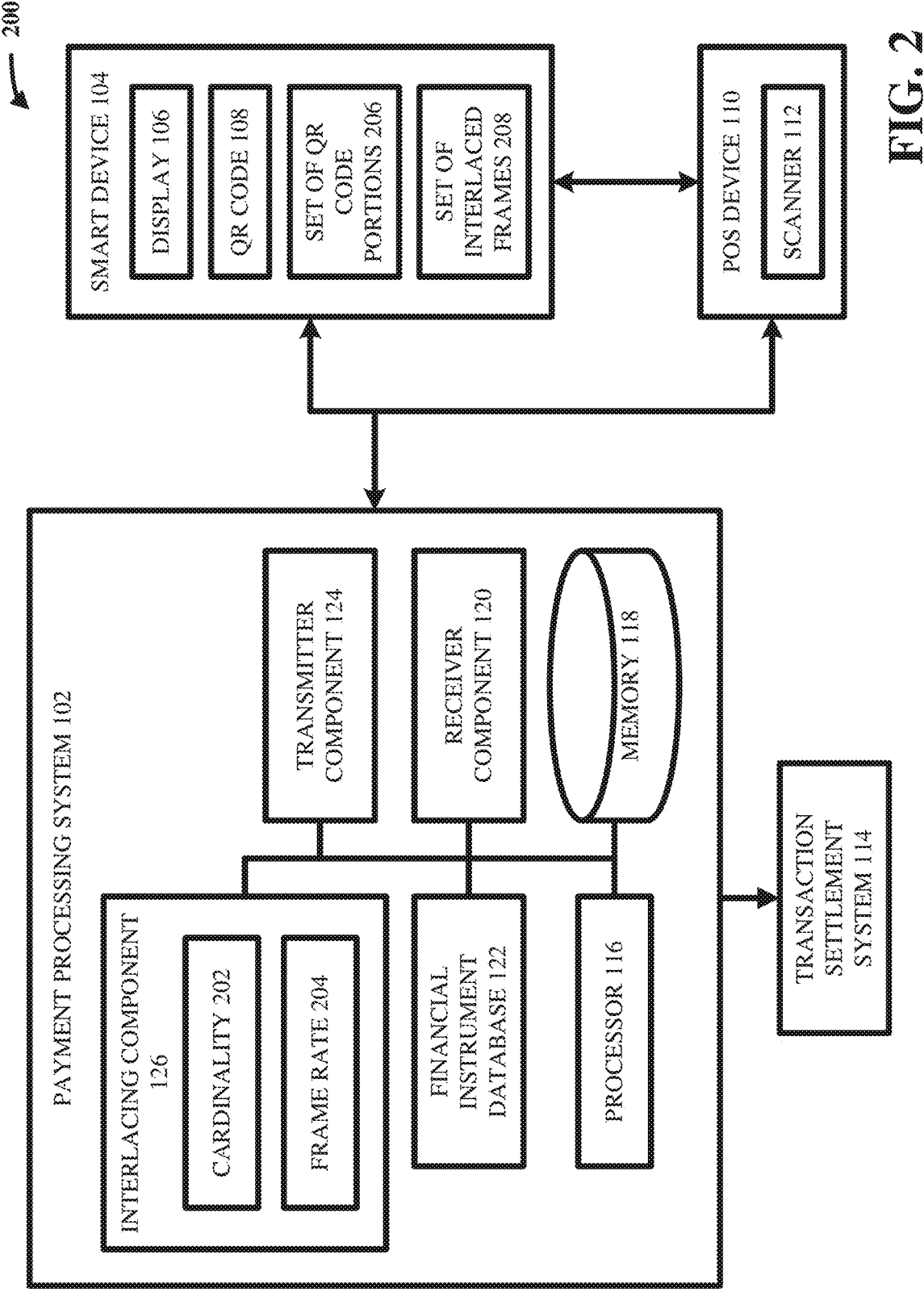
FIG. 2 illustrates a high-level block diagram of an example, non-limiting system including a determined cardinality and a determined frame rate that facilitates relay attack prevention for electronic QR codes via frame interlacing in accordance with one or more embodiments described herein.

FIG. 2 illustrates a high-level block diagram of an example, non-limiting system 200 including a determined cardinality and a determined frame rate that can facilitate relay attack prevention for electronic QR codes via frame interlacing in accordance with one or more embodiments described herein. As shown, the system 200 can, in some cases, comprise the same components as the system 100, and can further comprise the cardinality 202 and the frame rate 204.

In various embodiments, the interlacing component 126 can determine and/or identify the cardinality 202 and/or the frame rate 204. In some cases, such determination and/or identification can be random (e.g., the interlacing component 126 can randomly select the cardinality 202 from a range of possible and/or available cardinalities; the interlacing component 126 can randomly select the frame rate 204 from a range of possible and/or available frame rates). In various other cases, such determination and/or identification can be facilitated in any other suitable fashion and/or according to any other suitable security pattern/scheme. In various instances, the cardinality 202 and/or the frame rate 204 can have any suitable values. In various aspects, the cardinality 202 and/or the frame rate 204 can be considered as parameters that will govern the transaction between the smart device 104 and the POS device 110 in order to heighten a level of security associated with the QR code 108. In various instances, the transmitter component 124 can privately (e.g., in encrypted fashion) transmit the cardinality 202 and/or the frame rate 204 to both the smart device 104 and the POS device 110.

In response to receiving the cardinality 202, the smart device 104 can decompose the QR code 108 into a set of QR code portions 206. In various cases, the set of QR code portions 206 can be considered as fragments and/or puzzle pieces which can be collectively assembled together to form the QR code 108. In various aspects, the set of QR code portions 206 can have the cardinality 202. That is, the number of portions in the set of QR code portions 206 can be equal to the cardinality 202 (e.g., if the cardinality 202 is 13, the set of QR code portions 206 can contain 13 different portions which can collectively be assembled to form the QR code 108). In various instances, the smart device 104 can implement any suitable mathematical and/or computational technique for decomposing and/or fracturing the QR code 108 into the set of QR code portions 206. In various aspects, the smart device 104 can generate a set of interlaced frames 208 based on the set of QR code portions 206. Specifically, the smart device 104 can generate a separate frame for each of the portions in the set of the QR code portions 206. In other words, each frame of the set of interlaced frames 208 can depict and/or illustrate a respectively corresponding portion from the set of QR code portions 206. In still other words, different frames in the set of interlaced frames 208 can depict and/or illustrate different portions of the QR code 108. In some embodiments, a frame from the set of interlaced frames 208 can depict any suitable number of portions from the set of QR code portions 206, provided that no single frame depicts all of the portions in the set of QR code portions 206. In any case, each frame from the set of interlaced frames 208 can depict less than an entirety of the QR code 108.

In response to receiving the frame rate 204, the smart device 104 can sequentially and/or consecutively render the set of interlaced frames 208 on the display 106 at the frame rate 204. In various aspects, this can cause no more than one portion from the set of QR code portions 206 to be rendered on the display 106 at any given moment in time (e.g., in embodiments where multiple portions are included in a frame, it is still the case that no single frame depicts the entirety of the QR code 108 at once). Because no frame of the set of interlaced frames 208 depicts the entirety of the QR code 108, the entirety of the QR code 108 is not rendered on the display 106 at any given moment in time. Thus, if an attacking device impermissibly captures an image of the display 106 in an attempted relay attack, the captured image cannot depict all of the QR code 108. Thus, it is more difficult for the attacking device to complete a relay attack on the QR code 108.

In response to receiving the cardinality 202 and/or the frame rate 204, the POS device 110 can adjust/reconfigure settings of the scanner 112 based on the cardinality 202 and/or the frame rate 204. In some cases, the shutter speed of the scanner 112 can be set equal to the frame rate 204, and the scanner 112 can scan/capture a number of images of the display 106, where the number of images is equal to the cardinality 202. In various aspects, adjusting the settings of the scanner 112 in this way can allow the scanner 112 to scan/capture the set of interlaced frames 208. In other words, because the POS device 110 knows the cardinality 202 and the frame rate 204, the POS device 110 can controllably modulate its scanning settings/parameters so that it can scan/capture all of the set of interlaced frames 208. In contrast, an attacking device does not know the cardinality 202 and/or the frame rate 204, and thus cannot easily capture the set of interlaced frames 208.

As explained above, the POS device 110 can transmit the set of interlaced frames 208 to the receiver component 120. Because the payment processing system 102 has all of the set of interlaced frames 208, the payment processing system 102 can assemble and/or construct an entirety of the QR code 108 based on the set of interlaced frames 208 (e.g., by superimposing all of the set of interlaced frames 208 on top of one another, and/or by otherwise stitching together via any suitable technique the set of QR code portions 206). Once the payment processing system 102 knows the entirety of the QR code 108, the payment processing system 102 can determine/identify the payment information corresponding to the QR code 108 (e.g., via the financial instrument database 122), and the transmitter component 124 can transmit the payment information corresponding to the QR code 108 to the transaction settlement system 114.

Figure 3:
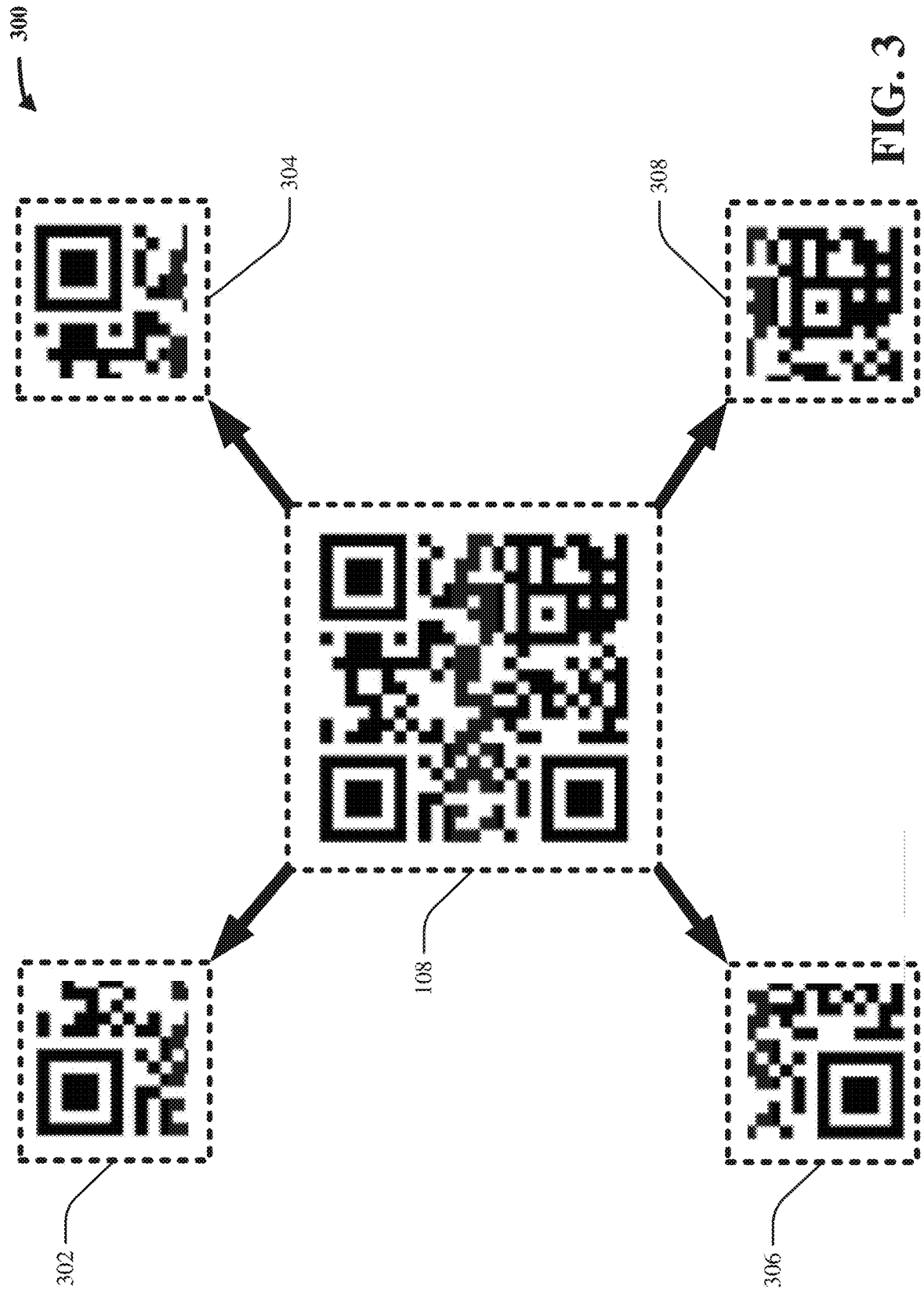
FIG. 3 illustrates, in an exemplary and non-limiting fashion, how an electronic QR code can be decomposed in a plurality of portions/fragments in order to facilitate relay attack prevention via frame interlacing in accordance with one or more embodiments described herein.

FIG. 3 illustrates, in an exemplary and non-limiting fashion, how an electronic QR code can be decomposed in a plurality of portions/fragments in order to facilitate relay attack prevention via frame interlacing in accordance with one or more embodiments described herein.

As shown, FIG. 3 depicts an exemplary, non-limiting version of the QR code 108. In various aspects, the QR code 108 can be physically and/or spatially decomposed/fractured into constituent portions/fragments. Specifically, when the cardinality 202 is equal to 4, the QR code 108 can be decomposed into four different portions/fragments: a portion 302, a portion 304, a portion 306, and/or a portion 308. In various cases, the portion 302 can represent an upper-left fragment of the QR code 108, the portion 304 can represent an upper-right fragment of the QR code 108, the portion 306 can represent a lower-left fragment of the QR code 108, and the portion 308 can represent a lower-right fragment of the QR code 108. In various aspects, the portions 302, 304, 306, and 308 can collectively be considered as the set of QR code portions 206. In various cases, the portions 302, 304, 306, and 308 can be stitched back together (e.g., like pieces of a puzzle) in order to form the entirety of the QR code 108.

Although FIG. 3 shows that the QR code 108 can be decomposed into four equally-sized and non-overlapping portions, this is exemplary and non-limiting. In various aspects, the QR code 108 can be decomposed into any suitable number of any suitably sized and/or suitably shaped portions/fragments, and any of those portions/fragments can be overlapping and/or non-overlapping with each other. In various aspects, the number of portions/fragments into which the QR code 108 is decomposed can depend upon the cardinality 202 (e.g., can be equal to the cardinality 202).

Figure 4:
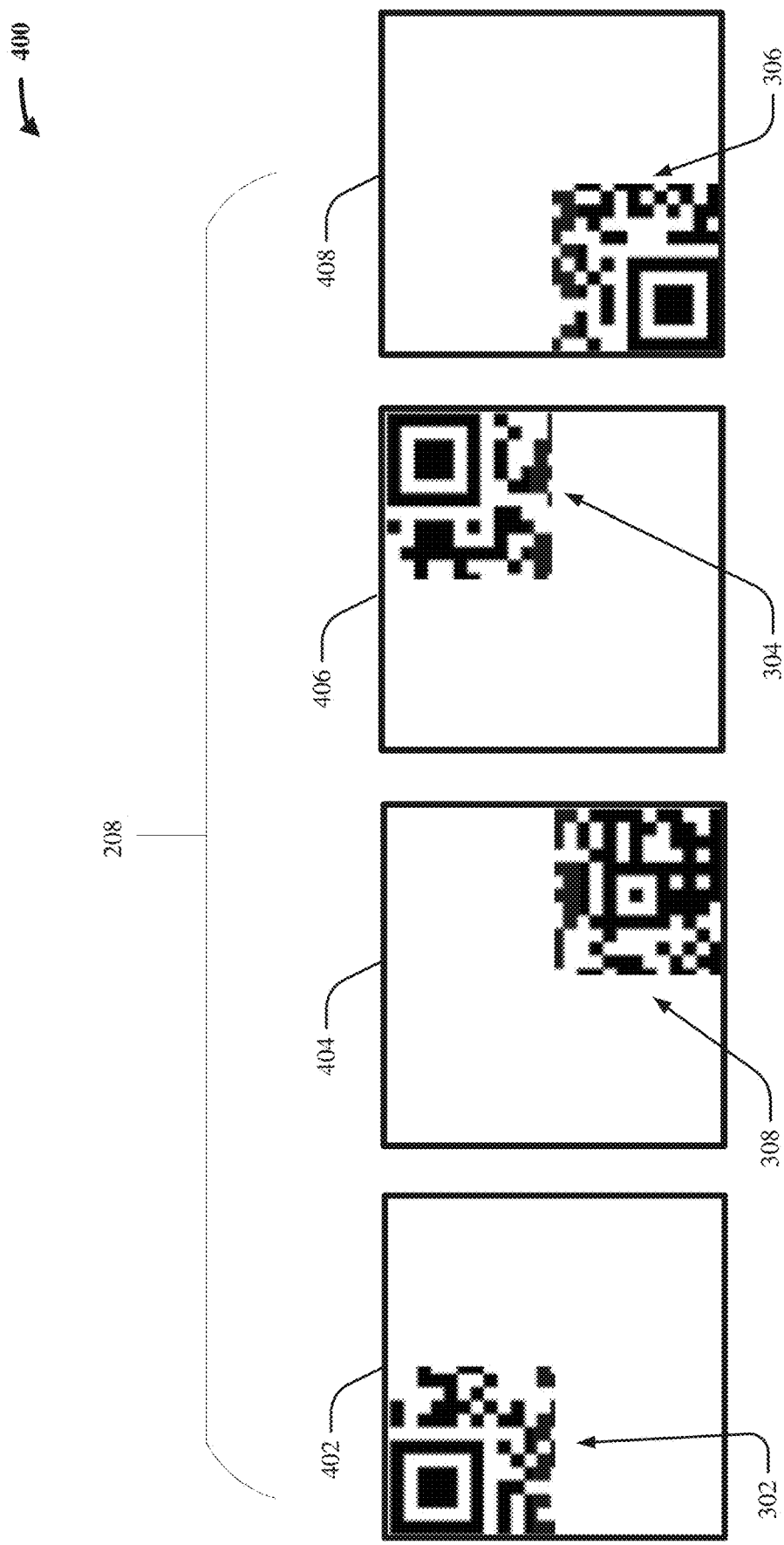
FIG. 4 illustrates, in an exemplary and non-limiting fashion, how a plurality of interlaced frames can be fabricated from a plurality of portions/fragments of an electronic QR code in order to facilitate relay attack prevention via frame interlacing in accordance with one or more embodiments described herein.

FIG. 4 illustrates, in an exemplary and non-limiting fashion, how a plurality of interlaced frames can be fabricated from a plurality of portions/fragments of an electronic QR code in order to facilitate relay attack prevention via frame interlacing in accordance with one or more embodiments described herein. In other words, FIG. 4 shows how a set of interlaced frames can be formed based on the portions 302, 304, 306, and 308.

As shown, in various embodiments, each portion from the set of QR code portions 206 can be depicted and/or illustrated in its own respectively corresponding frame from the set of interlaced frames 208. Specifically, as shown, the set of interlaced frames 208 can, in some embodiments, comprise a frame 402 that depicts/illustrates the portion 302, a frame 404 that depicts/illustrates the portion 308, a frame 406 that depicts/illustrates the portion 304, and/or a frame 408 that depicts/illustrates the portion 306. As shown, in various cases, each frame from the set of interlaced frames 208 can depict/illustrate a different portion from the set of QR code portions 206 (e.g., the portion depicted in frame 402 is different from the portions depicted in the other frames, the portion depicted in frame 404 is different from the portions depicted in the other frames, the portion depicted in frame 406 is different from the portions depicted in the other frames, the portion depicted in frame 408 is different from the portions depicted in the other frames).

As shown, in various embodiments, the set of interlaced frames 208 can be structured so that an original positional relationship and/or an original spatial configuration of the set of QR code portions 206 is maintained. In other words, the frame 402 depicts the portion 302 which is the upper-left fragment of the QR code 108; thus, the portion 302 can be in an upper-left region of the frame 402. Similarly, the frame 404 depicts the portion 308 which is the lower-right fragment of the QR code 108; thus, the portion 308 can be in a lower-right region of the frame 404. Likewise, the frame 406 depicts the portion 304 which is the upper-right fragment of the QR code 108; thus, the portion 304 can be in an upper-right region of the frame 406. Lastly, the frame 408 depicts the portion 306 which is the lower-left fragment of the QR code 108; thus, the portion 306 can be in a lower-left region of the frame 408. In this way, an entirety of the QR code 108 can be constructed, assembled, and/or obtained by superimposing the set of interlaced frames 208 on top of each other (e.g., by superimposing the frames 402, 404, 406, and 408 all on top of one another).

As mentioned above, the smart device 104 can sequentially render the set of interlaced frames 208 on the display 106 at the frame rate 204. If the frame rate 204 is equal to R for any suitable number R, the smart device 104 can render the frame 402 on the display 106 for a duration of 1/R, can next render the frame 404 on the display 106 for a duration of 1/R, can next render the frame 406 on the display 106 for a duration of 1/R, can next render the frame 408 on the display 106 for a duration of 1/R, and can then repeat, continue, and/or loop this rendition sequence for any suitable amount of time. In various cases, any other suitable frame ordering can be implemented (e.g., starting with frame 408 and progressing to frame 402). In various aspects, such sequential rendering can, in some cases, create a visual effect (e.g., animation) in which the entirety of the QR code 108 is visibly perceptible to a human onlooker. Nevertheless, in such embodiments, the entirety of the QR code 108 is not rendered on the display 106 at any single moment in time. As explained thoroughly above, this can prevent and/or impede relay attacks by making it more difficult for an attacking device to capture an entirety of the QR code 108.

Figure 5:
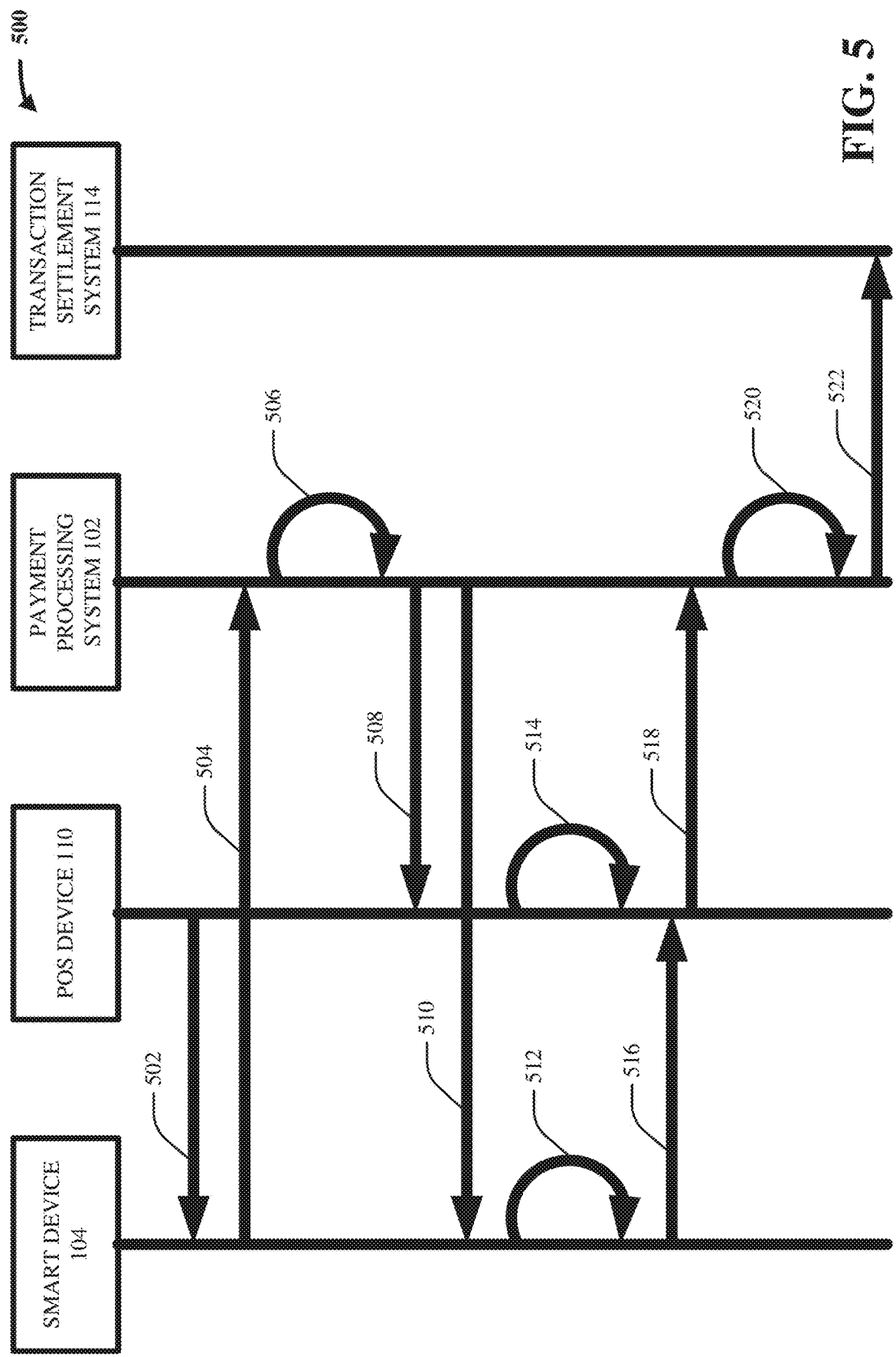
FIG. 5 illustrates a high-level communication diagram of an example, non-limiting workflow that facilitates relay attack prevention for electronic QR codes via frame interlacing in accordance with one or more embodiments described herein.

FIG. 5 illustrates a high-level communication diagram of an example, non-limiting workflow 500 that can facilitate relay attack prevention for electronic QR codes via frame interlacing in accordance with one or more embodiments described herein.

In various embodiments, at act 502, the smart device 104 can receive from the POS device 110 (e.g., from an electronic beacon associated with the POS device 110) any suitable identification information of the POS device 110.

In various aspects, at act 504, the smart device 104 can transmit an electronic message to the payment processing system 102, notifying the payment processing system 102 that the smart device 104 is engaging and/or about to engage in a transaction with the POS device 110.

In various instances, at act 506, the payment processing system 102 can determine and/or identify (e.g., randomly and/or according to any other suitable scheme/technique) the cardinality 202 and/or the frame rate 204, which will govern the transaction between the smart device 104 and the POS device 110.

In various cases, at act 508, the payment processing system 102 can transmit an electronic message to the POS device 110, notifying the POS device 110 of the cardinality 202 and/or the frame rate 204.

In various embodiments, at act 510, the payment processing system 102 can transmit an electronic message to the smart device 104, notifying the smart device 104 of the cardinality 202 and/or the frame rate 204.

In various instances, in response to act 510, the smart device 104 can, at act 512, decompose the QR code 108 into the set of QR code portions 206 and can generate the set of interlaced frames 208 based on the set of QR code portions 206.

In various aspects, in response to act 508, the POS device 110 can, at act 514, reconfigure/adjust its scanner settings based on the cardinality 202 and/or the frame rate 204.

In various cases, at act 516, the smart device 104 can consecutively render the set of interlaced frames 208 on the display 106 for scanning by the POS device 110.

In various embodiments, at act 518, the POS device 110 can scan the set of interlaced frames 208 and can transmit the set of interlaced frames 208 to the payment processing system 102.

In various instances, at act 520, the payment processing system 102 can construct and/or assemble the QR code 108 based on the set of interlaced frames 208 and/or can determine payment information that corresponds to the QR code 108.

In various aspects, at act 522, the payment processing system 102 can transmit the determined payment information to the transaction settlement system 114.

As explained thoroughly above, when frame interlacing is implemented as described herein, it can be more difficult for an attacking device to capture the QR code 108. Thus, risks associated with relay attacks of the QR code 108 can be diminished.

Although not shown in the figures, in various aspects, the smart device 104 can determine and/or identify the cardinality 202 (e.g., a desired cardinality) and/or the frame rate 204 (e.g., a desired frame rate). In such embodiments, the smart device 104 can generate the set of QR code portions 206 and/or the set of interlaced frames 208 as described above, the smart device 104 can transmit the cardinality 202 and/or the frame rate 204 to the payment processing system 102 (e.g., in the same way that the smart device 104 can inform/notify the payment processing system 102 of the identity of the POS device 110), and the payment processing system 102 can forward the cardinality 202 and/or the frame rate 204 to the POS device 110, so that the POS device 110 can adjust the shutter speed of the scanner 112 accordingly. In various other embodiments, the smart device 104 can determine and/or identify the cardinality 202 and/or the frame rate 204, and the smart device 104 can transmit the cardinality 202 and/or the frame 204 directly to the POS device 110 so that the POS device 110 can adjust the shutter speed of the scanner 112 accordingly. In any case, both the smart device 104 and the POS device 110 can be informed and/or notified (e.g., in any suitable way) of the cardinality 202 and/or the frame rate 204, so that the smart device 104 and the POS device 110 can reconfigure their display and/or image-capture settings accordingly so as to facilitate frame interlacing.

Although FIG. 5 depicts an exemplary embodiment in which the smart device 104 receives identification information of the POS device 110 from an electronic beacon of the POS device 110 and in which the smart device 104 transmits to the payment processing system 102 both identification information of the smart device 104 and the identification information of the POS device 110, this is exemplary and non-limiting. In various embodiments, the smart device 104 can instead transmit its own identification information to the POS device 110, and the POS device 110 can forward the identification information of the smart device 104 and identification information of the POS device 110 to the payment processing system 102 (e.g., in other words, some embodiments can involve the smart device 104 notifying the payment processing system 102 that the smart device 104 is transacting and/or about to the transact with the POS device 110, and other embodiments can involve the POS device 110 notifying the payment processing system 102 that the smart device 104 is transacting and/or about to the transact with the POS device 110).

Figure 6:
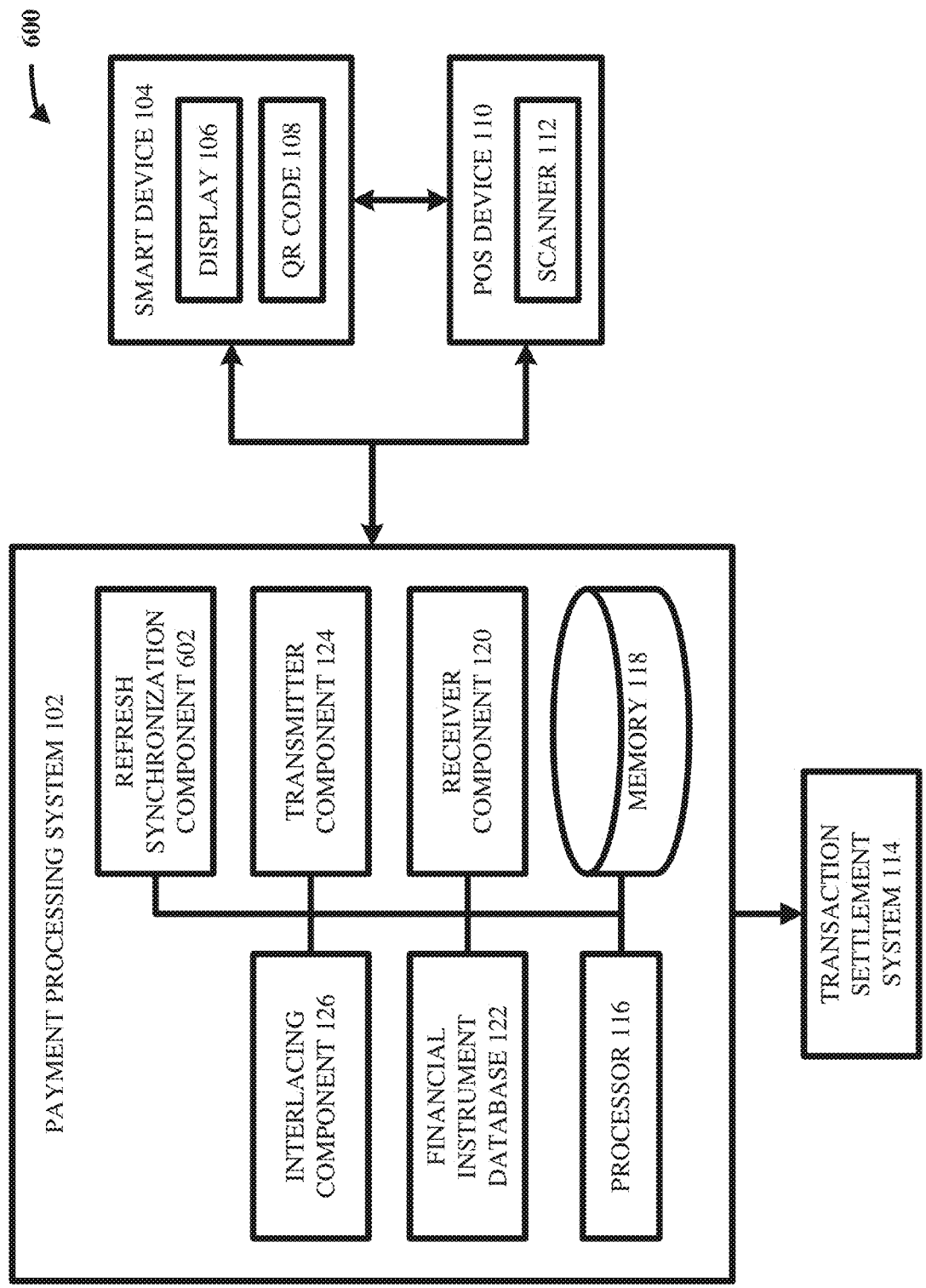
FIG. 6 illustrates a high-level block diagram of an example, non-limiting system including a refresh synchronization component that facilitates relay attack prevention for electronic QR codes via refresh rate synchronization in accordance with one or more embodiments described herein.

FIG. 6 illustrates a high-level block diagram of an example, non-limiting system 600 including a refresh synchronization component that can facilitate relay attack prevention for electronic QR codes via refresh rate synchronization in accordance with one or more embodiments described herein. As shown, the system 600 can, in some cases, comprise the same components as the system 100, and can further comprise a refresh synchronization component 602.

In various embodiments, the payment processing system 102 can comprise the refresh synchronization component 602. In various aspects, the refresh synchronization component 602 can provide some functionality that can help to prevent and/or impede relay attacks on the QR code 108, as explained below. As mentioned above, before the display 106 of the smart device 104 is presented to the scanner 112 of the POS device 110 for scanning, the smart device 104 can receive identification information associated with the POS device 110 from an electronic beacon (not shown in the figures) that is associated with the POS device 110. In various aspects, the smart device 104 can transmit to the receiver component 120 an electronic message that includes the identification information of the POS device 110, that includes any suitable identification information associated with the smart device 104, and/or that indicates that the smart device 104 is transacting with and/or is about to transact with the POS device 110. Based on this electronic message from the smart device 104, the refresh synchronization component 602 can determine particular security parameters that will govern the transaction between the smart device 104 and the POS device 110 and that will help to prevent and/or impede relay attacks on the QR code 108. Specifically, the refresh synchronization component 602 can determine and/or identity a frequency value which can be leveraged to increase the security of the QR code 108. In various instances, the transmitter component 124 can transmit the determined frequency value to both the smart device 104 and the POS device 110.

In response to receiving the determined frequency value, the smart device 104 can reconfigure and/or adjust the refresh rate (which can be distinct from frame rate, as those of ordinary skill in the art will appreciate) of the display 106 based on the determined frequency value. In some cases, the refresh rate can become equal to the determined frequency value. In other cases, the refresh rate can be any suitable multiple and/or factor of the determined frequency value.

In response to receiving the determined frequency value, the POS device 110 can reconfigure and/or adjust the shutter speed of the scanner 112 based on the determined frequency value. In some cases, the shutter speed can become equal to the determined frequency value. In other cases, the shutter speed can be any suitable multiple and/or factor of the determined frequency value.

In various embodiments, since both the refresh rate of the smart device 104 (e.g., of the display 106) and the shutter speed of the POS device 110 (e.g., of the scanner 112) can be based on the determined frequency value, the refresh rate can be said to be synchronized with the shutter speed. In some cases, this synchronization can take the form of equality (e.g., the refresh rate can be equal to the shutter speed). In various instances, the smart device 104 can render the QR code 108 on the display 106 at the adjusted refresh rate, and the POS device 110 can scan the display 106 via the scanner 112 at the adjusted shutter speed, thereby generating/obtaining a scanned image of the QR code 108.

In various aspects, when the refresh rate of the smart device 104 is synchronized with the shutter speed of the POS device 110, the scanned image of the QR code 108 can lack optical distortions and/or imaging artifacts. However, when the refresh rate of the smart device 104 is not synchronized with the shutter speed of the POS device 110, the scanned image of the QR code 108 can contain various optical distortions and/or imaging artifacts (e.g., the scanned image can contain shadowy bars and/or shaded shapes superimposed over the QR code 108). In various cases, the refresh synchronization component 602 can comprise a trained machine learning model that is configured to receive the scanned image of the QR code 108 as input and to generate as output a determination as to whether the scanned image contains/depicts such optical distortions and/or artifacts. In various aspects, the presence and/or absence of such optical distortions and/or artifacts can be used to ferret out relayed QR codes.

For example, if no relay attack is attempted, the POS device 110 can simply scan the display 106 of the smart device 104, thereby generating a scanned image of the QR code 108. The POS device 110 can transmit the scanned image to the receiver component 120. The refresh synchronization component 602 can feed the scanned image into the trained machine learning model, and the trained machine learning model can determine whether or not the scanned image contains detectable distortions/artifacts. Since the shutter speed of the POS device 110 is synchronized with the refresh rate of the smart device 104, the scanned image can contain none of such distortions/artifacts. The trained machine learning model can detect this absence of distortions/artifacts, and can thus determine that the QR code 108 is not involved in a relay attack. Accordingly, the payment processing system 102 can identify/determine the payment information corresponding to the QR code 108, and the transmitter component 124 can transmit the payment information to the transaction settlement system 114.

However, consider a situation where a relay attack is attempted. In such case, an attacking device (not shown in the figures) can impermissibly steal/capture an image of the QR code 108 from the display 106 of the smart device 104. Subsequently, the attacking device can render the stolen/captured image of the QR code 108 on its own electronic display for scanning by the POS device 110. The POS device 110 can scan the electronic display of the attacking device, thereby generating a scanned image of the stolen/captured version of the QR code 108. The POS device 110 can transmit the scanned image to the receiver component 120. The refresh synchronization component 602 can feed the scanned image into the trained machine learning model, and the trained machine learning model can determine whether or not the scanned image contains detectable distortions/artifacts. Since the shutter speed of the POS device 110 is likely not synchronized with the refresh rate of the attacking device, the scanned image of the stolen/captured version of the QR code 108 can contain optical distortions/artifacts. The trained machine learning model can detect these optical distortions/artifacts and can thus determine that the QR code 108 is involved in a relay attack. Accordingly, the payment processing system 102 can refrain from identifying/determining the payment information corresponding to the QR code 108, can refrain from transmitting the payment information to the transaction settlement system 114, and/or can transmit an unsuccessful validation/verification message to the POS device 110.

Figure 7:
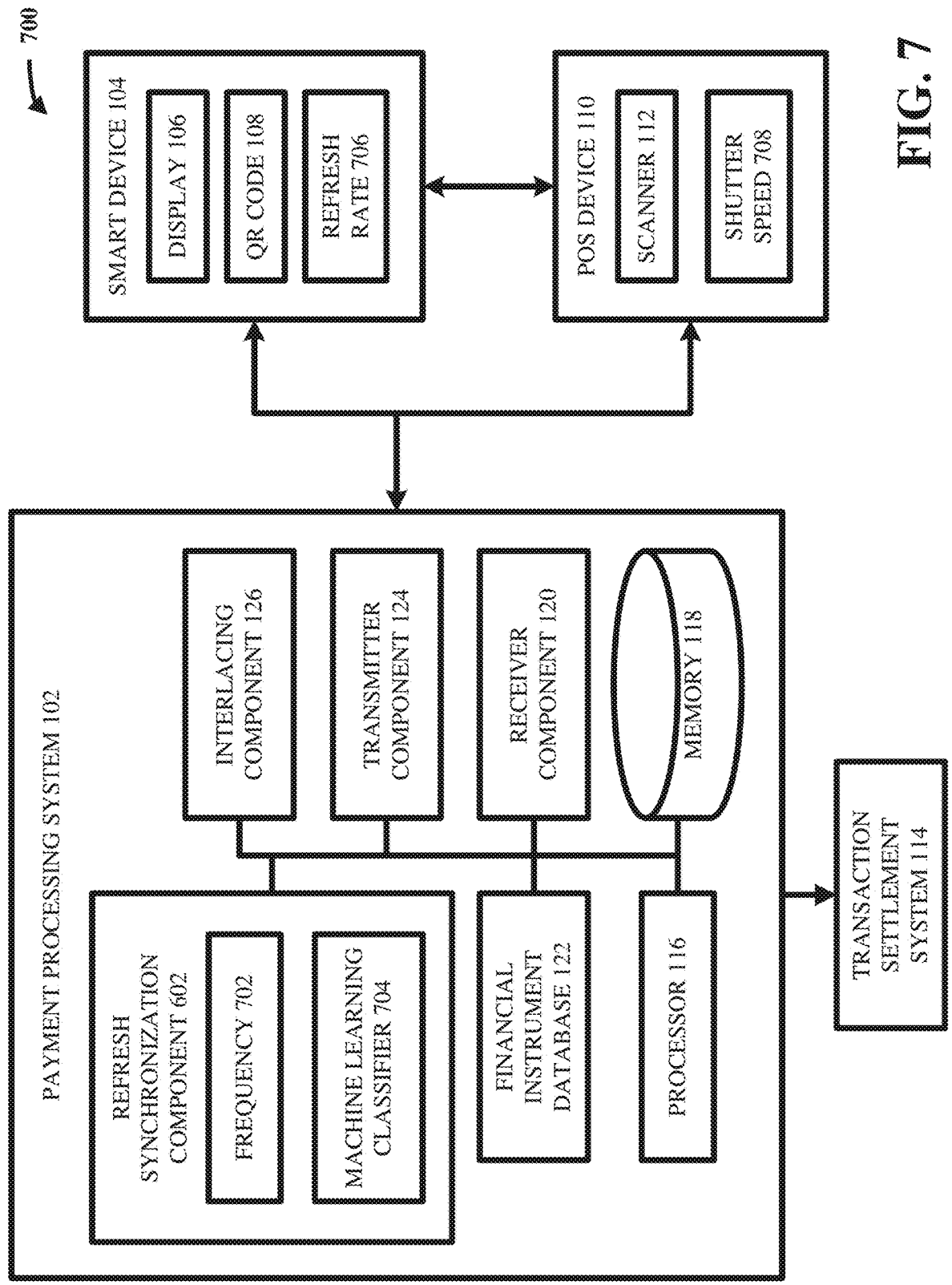
FIG. 7 illustrates a high-level block diagram of an example, non-limiting system including a determined frequency and a machine learning classifier that facilitates relay attack prevention for electronic QR codes via refresh rate synchronization in accordance with one or more embodiments described herein.

FIG. 7 illustrates a high-level block diagram of an example, non-limiting system 700 including a determined frequency and a machine learning classifier that can facilitate relay attack prevention for electronic QR codes via refresh rate synchronization in accordance with one or more embodiments described herein. As shown, the system 700 can, in some cases, comprise the same components as the system 600, and can further comprise a frequency 702 and a machine learning classifier 704.

In various embodiments, the refresh synchronization component 602 can determine and/or identify the frequency 702. In some cases, such determination and/or identification can be random (e.g., the refresh synchronization component 602 can randomly select the frequency 702 from a range of possible and/or available frequencies). In various other cases, such determination and/or identification can be facilitated in any other suitable fashion and/or according to any other suitable security pattern/scheme. In various instances, the frequency 702 can have any suitable value. In various aspects, the frequency 702 can be considered as a parameter that will govern the transaction between the smart device 104 and the POS device 110 in order to heighten a level of security associated with the QR code 108. In various instances, the transmitter component 124 can privately (e.g., in encrypted fashion) transmit the frequency 702 to both the smart device 104 and the POS device 110.

In response to receiving the frequency 702, the smart device 104 can adjust and/or reconfigure a refresh rate 706 that is associated with the smart device 104 (e.g., associated with the display 106). In some cases, the refresh rate 706 can be a function of the frequency 702. For instance, in some cases, the refresh rate 706 can be adjusted to be equal to the frequency 702. In other cases, the refresh rate 706 can be adjusted to be any suitable multiple and/or factor of the frequency 702.

In response to receiving the frequency 702, the POS device 110 can adjust and/or reconfigure a shutter speed 708 that is associated with the POS device 110 (e.g., associated with the scanner 112). In some cases, the shutter speed 708 can be a function of the frequency 702. For instance, in some cases, the shutter speed 708 can be adjusted to be equal to the frequency 702. In other cases, the shutter speed 708 can be adjusted to be any suitable multiple and/or factor of the frequency 702.

In various aspects, because both the refresh rate 706 and the shutter speed 708 can be based on the frequency 702 (e.g., because the refresh rate 706 and the shutter speed 708 can be equal to each other and/or can be whole multiples/factors of each other), the refresh rate 706 can be said to be synchronized with the shutter speed 708. In various instances, the smart device 104 can render the QR code 108 on the display 106 at the refresh rate 706, and the POS device 110 can scan, via the scanner 112, the display 106 at the shutter speed 708, thereby generating a scanned image of the QR code 108. In various cases, the POS device 110 can transmit the scanned image of the QR code 108 to the receiver component 120.

In various embodiments, the refresh synchronization component 602 can comprise the machine learning classifier 704. In various aspects, the machine learning classifier 704 can be any suitable, computer-implemented artificial intelligence algorithm (e.g., neural network, naïve Bayes, decision tree, logistic regression, linear regression, and/or so on). In various aspects, the machine learning classifier 704 can receive as input the scanned image of the QR code 108, and can produce as output a determination as to whether the scanned image of the QR code 108 contains/depicts optical distortions and/or imaging artifacts indicative of non-synchronization. In other words, the machine learning classifier 704 can detect distortions/artifacts in the scanned image of the QR code 108. As explained above, such distortions/artifacts can be caused by non-synchronization between the shutter speed of the POS device 110 and the refresh rate of the electronic display that is scanned by the POS device 110. Since the refresh rate 706 of the smart device 104 is synchronized with the shutter speed 708 of the POS device 110, there can fail to be such distortions/artifacts in the scanned image of the QR code 108 when no relay attack is attempted. However, if an attacking device presents its own electronic display for scanning by the POS device 110 in an attempted relay attack, such distortions/artifacts are likely to be contained in the resulting scanned image since it can be likely that the refresh rate of the attacking device is not synchronized with the shutter speed 708 of the POS device 110 (e.g., the attacking device is not informed/notified of the frequency 702). Accordingly, if the machine learning classifier 704 does not detect distortions/artifacts in the scanned image of the QR code 108, the payment processing system 102 can determine/infer that the QR code 108 is not involved in a relay attack, and can thus transmit payment information corresponding to the QR code 108 to the transaction settlement system 114. On the other hand, if the machine learning classifier 704 does detect distortions/artifacts in the scanned image of the QR code 108, the payment processing system 102 can determine/infer that the QR code 108 is involved in a relay attack, and can thus refrain from transmitting payment information corresponding to the QR code 108 to the transaction settlement system 114.

To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

FIG. 8 illustrates exemplary and non-limiting optical distortions that can manifest in the absence of refresh rate synchronization in accordance with one or more embodiments described herein.

As shown, FIG. 8 depicts an exemplary scanned image 802 that lacks imaging artifacts that are indicative of non-synchronization, and FIG. 8 also depicts an exemplary scanned image 804 that includes imaging artifacts 806 that are indicative of non-synchronization. In various aspects, when the POS device 110 scans the display 106 of the smart device 104, the result can be the scanned image 802. As explained above, because the refresh rate 706 is synchronized with (e.g., equal to and/or a multiple/factor of) the shutter speed 708 of the POS device 110, the scanned image 802 can lack flickers, shadowy shapes, and/or other imaging artifacts that are indicative of non-synchronization. In various other aspects, when the POS device 110 scans the electronic display of an attacking device, the result can be the scanned image 804. As explained above, because the refresh rate of the attacking device is likely not synchronized with (e.g., equal to and/or a multiple/factor of) the shutter speed 708 of the POS device 110, the scanned image 804 can include the imaging artifacts 806 (e.g., flickers, shadowy shapes/bars) that are indicative of non-synchronization. In various aspects, the machine learning classifier 704 can be trained/configured to detect the imaging artifacts 806 in a scanned image of a QR code that is transmitted to the receiver component 120 by the POS device 110. If the machine learning classifier 704 detects the imaging artifacts 806 in the scanned image, the payment processing system 102 can determine/infer that a relay attack has been attempted. In contrast, if the machine learning classifier 704 does not detect the imaging artifacts 806 in the scanned image (e.g., determines that there are no such distortions in the scanned image), the payment processing system 102 can determine/infer that a relay attack has not been attempted.

It should be appreciated that FIG. 8 is exemplary and non-limiting. In various aspects, any other suitable types and/or shapes of detectable distortions can manifest in a scanned image of the QR code 108 if refresh rate synchronization is absent.

Figure 9:
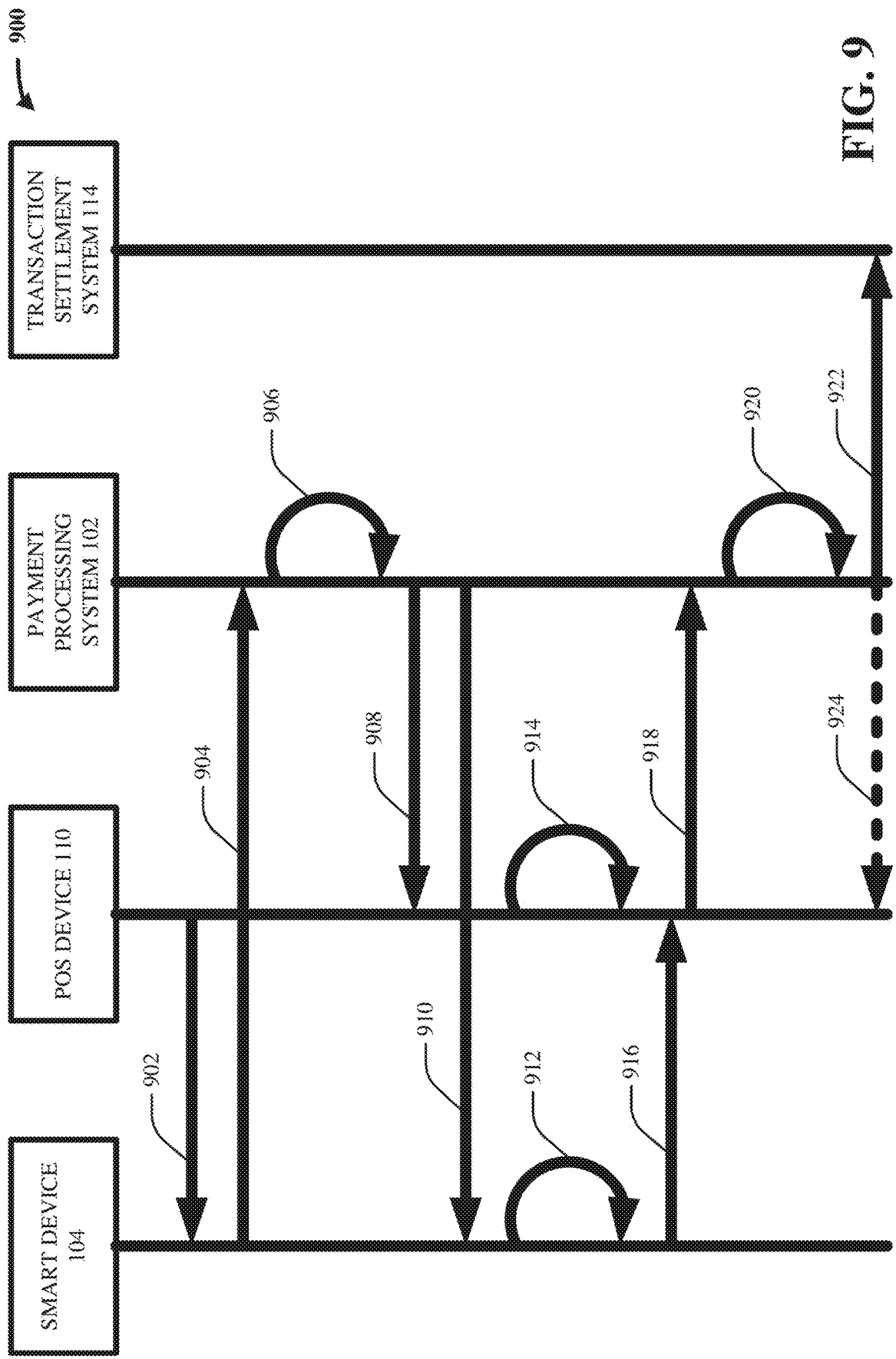
FIG. 9 illustrates a high-level communication diagram of an example, non-limiting workflow that facilitates relay attack prevention for electronic QR codes via refresh rate synchronization in accordance with one or more embodiments described herein.

FIG. 9 illustrates a high-level communication diagram of an example, non-limiting workflow 900 that can facilitate relay attack prevention for electronic QR codes via refresh rate synchronization in accordance with one or more embodiments described herein.

In various embodiments, at act 902, the smart device 104 can receive from the POS device 110 (e.g., from an electronic beacon associated with the POS device 110) any suitable identification information of the POS device 110.

In various aspects, at act 904, the smart device 104 can transmit an electronic message to the payment processing system 102, notifying the payment processing system 102 that the smart device 104 is engaging and/or about to engage in a transaction with the POS device 110.

In various instances, at act 906, the payment processing system 102 can determine and/or identify (e.g., randomly and/or according to any other suitable scheme/technique) the frequency 702, which will govern the transaction between the smart device 104 and the POS device 110.

In various cases, at act 908, the payment processing system 102 can transmit an electronic message to the POS device 110, notifying the POS device 110 of the frequency 702.

In various embodiments, at act 910, the payment processing system 102 can transmit an electronic message to the smart device 104, notifying the smart device 104 of the frequency 702.

In various instances, in response to act 910, the smart device 104 can, at act 912, adjust, modulate, and/or reconfigure the refresh rate 706 based on the frequency 702 (e.g., can set the refresh rate 706 to be equal to and/or a whole multiple/factor of the frequency 702).

In various instances, in response to act 908, the POS device 110 can, at act 914, adjust, modulate, and/or reconfigure the shutter speed 708 based on the frequency 702 (e.g., can set the shutter speed 708 to be equal to and/or a whole multiple/factor of the frequency 702).

In various cases, at act 916, the smart device 104 can render the QR code 108 on the display 106 at the refresh rate 706, for scanning by the POS device 110.

In various embodiments, at act 918, the POS device 110 can scan the QR code 108 at the shutter speed 708 and can transmit the scanned image of the QR code 108 to the payment processing system 102.

In various instances, at act 920, the payment processing system 102 can execute the machine learning classifier 704 on the scanned image of the QR code 108 to detect optical distortions and/or artifacts that are indicative of non-synchronization (e.g., to detect the imaging artifacts 806).

In various aspects, at act 922, in response to determining that the scanned image of the QR code 108 does not include distortions/artifacts indicative of non-synchronization, the payment processing system 102 can transmit the determined payment information to the transaction settlement system 114.

In various aspects, at act 924, in response to determining that the scanned image of the QR code 108 does include distortions/artifacts indicative of non-synchronization, the payment processing system 102 can transmit an unsuccessful validation/verification message to the POS device 110.

As explained thoroughly above, when refresh rate synchronization is implemented as described herein, relayed QR codes can be more easily detected and/or ferreted out. Thus, risks associated with relay attacks of the QR code 108 can be diminished.

Figure 10:
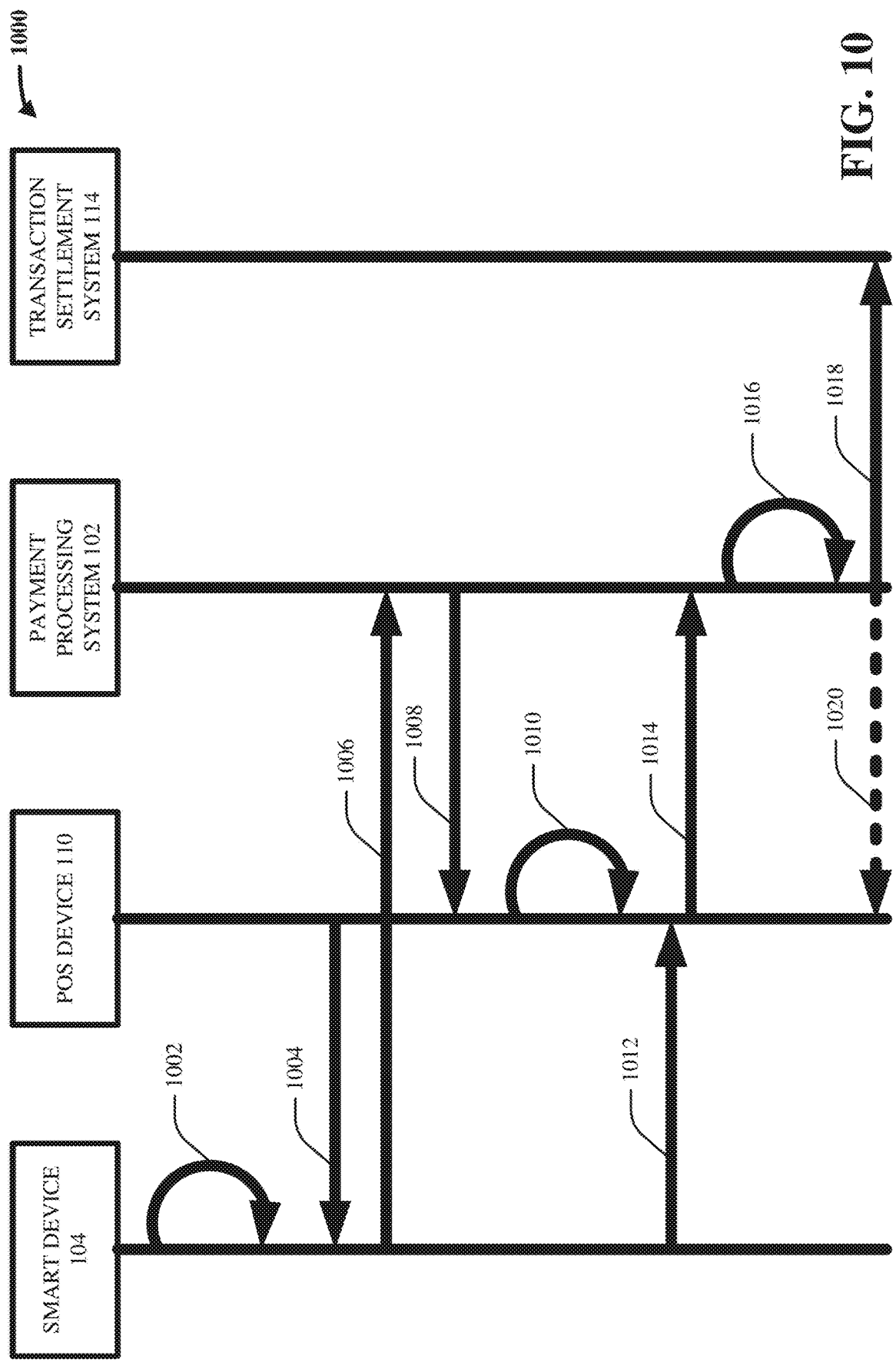
FIG. 10 illustrates a high-level communication diagram of an example, non-limiting workflow that facilitates relay attack prevention for electronic QR codes via refresh rate synchronization in accordance with one or more embodiments described herein.

FIG. 10 illustrates a high-level communication diagram of an example, non-limiting workflow 1000 that can facilitate relay attack prevention for electronic QR codes via refresh rate synchronization in accordance with one or more embodiments described herein. As explained, in some embodiments, the payment processing system 102 can determine a frequency (e.g., 702) that will govern the transaction between the smart device 104 and the POS device 110. In such cases, the payment processing system 102 can notify the smart device 104 and the POS device 110 of the determined frequency, the smart device 104 can accordingly update its refresh rate (e.g., 706), and the POS device 110 can accordingly update its shutter speed (e.g., 708). In other embodiments, however, the smart device 104 can identify a desired refresh rate to use for the transaction. In such case, the smart device 104 can adjust its own refresh rate as desired, and can inform/notify the payment processing system 102 of the desired refresh rate. The payment processing system 102 can then notify the POS device 110 of the desired refresh rate, and the POS device 110 can update/adjust its shutter speed accordingly. FIG. 10 illustrates an exemplary workflow of such embodiments.

In various embodiments, at act 1002, the smart device 104 can update and/or adjust the refresh rate 706 to a desired value.

In various instances, at act 1004, the smart device 104 can receive from the POS device 110 (e.g., from an electronic beacon associated with the POS device 110) any suitable identification information of the POS device 110.

In various aspects, at act 1006, the smart device 104 can transmit an electronic message to the payment processing system 102, notifying the payment processing system 102 that the smart device 104 is engaging and/or about to engage in a transaction with the POS device 110, and also informing the payment processing system 102 of the desired refresh rate value established by the smart device 104.

In various instances, at act 1008, the payment processing system 102 can transmit an electronic message to the POS device 110, notifying the POS device 110 of the desired refresh rate value established by the smart device 104.

In various embodiments, in response to act 1008, the POS device 110 can, at act 1010, adjust, modulate, and/or reconfigure the shutter speed 708 based on the desired refresh rate value established by the smart device 104 (e.g., can set the shutter speed 708 to be equal to and/or a whole multiple/factor of the desired refresh rate value).

In various cases, at act 1012, the smart device 104 can render the QR code 108 on the display 106 at the refresh rate 706 (which is set at the desired refresh rate value), for scanning by the POS device 110.

In various embodiments, at act 1014, the POS device 110 can scan the QR code 108 at the shutter speed 708 and can transmit the scanned image of the QR code 108 to the payment processing system 102.

In various instances, at act 1016, the payment processing system 102 can execute the machine learning classifier 704 on the scanned image of the QR code 108 to detect optical distortions and/or artifacts that are indicative of non-synchronization (e.g., to detect the imaging artifacts 806).

In various aspects, at act 1018, in response to determining that the scanned image of the QR code 108 does not include distortions/artifacts indicative of non-synchronization, the payment processing system 102 can transmit the determined payment information to the transaction settlement system 112.

In various aspects, at act 1020, in response to determining that the scanned image of the QR code 108 does include distortions/artifacts indicative of non-synchronization, the payment processing system 102 can transmit an unsuccessful validation/verification message to the POS device 110.

As explained thoroughly above, when refresh rate synchronization is implemented as described herein, relayed QR codes can be more easily detected and/or ferreted out. Thus, risks associated with relay attacks of the QR code 108 can be diminished.

Although not shown in the figures, in various aspects, the smart device 104 can determine and/or identify the frequency 702 (e.g., a desired refresh rate) and can transmit the frequency 702 directly to the POS device 110, so that the POS device 110 can adjust the shutter speed 708 of the scanner 112 accordingly. In any case, both the smart device 104 and the POS device 110 can be informed and/or notified (e.g., in any suitable way) of the frequency 702, so that the smart device 104 and the POS device 110 can reconfigure their display and/or image-capture settings accordingly so as to facilitate refresh rate synchronization.

Although FIGS. 9-10 depict exemplary embodiments in which the smart device 104 receives identification information of the POS device 110 from an electronic beacon of the POS device 110 and in which the smart device 104 transmits to the payment processing system 102 both identification information of the smart device 104 and the identification information of the POS device 110, this is exemplary and non-limiting. In various embodiments, the smart device 104 can instead transmit its own identification information to the POS device 110, and the POS device 110 can forward the identification information of the smart device 104 and identification information of the POS device 110 to the payment processing system 102 (e.g., in other words, some embodiments can involve the smart device 104 notifying the payment processing system 102 that the smart device 104 is transacting and/or about to the transact with the POS device 110, and other embodiments can involve the POS device 110 notifying the payment processing system 102 that the smart device 104 is transacting and/or about to the transact with the POS device 110).

Figure 11:
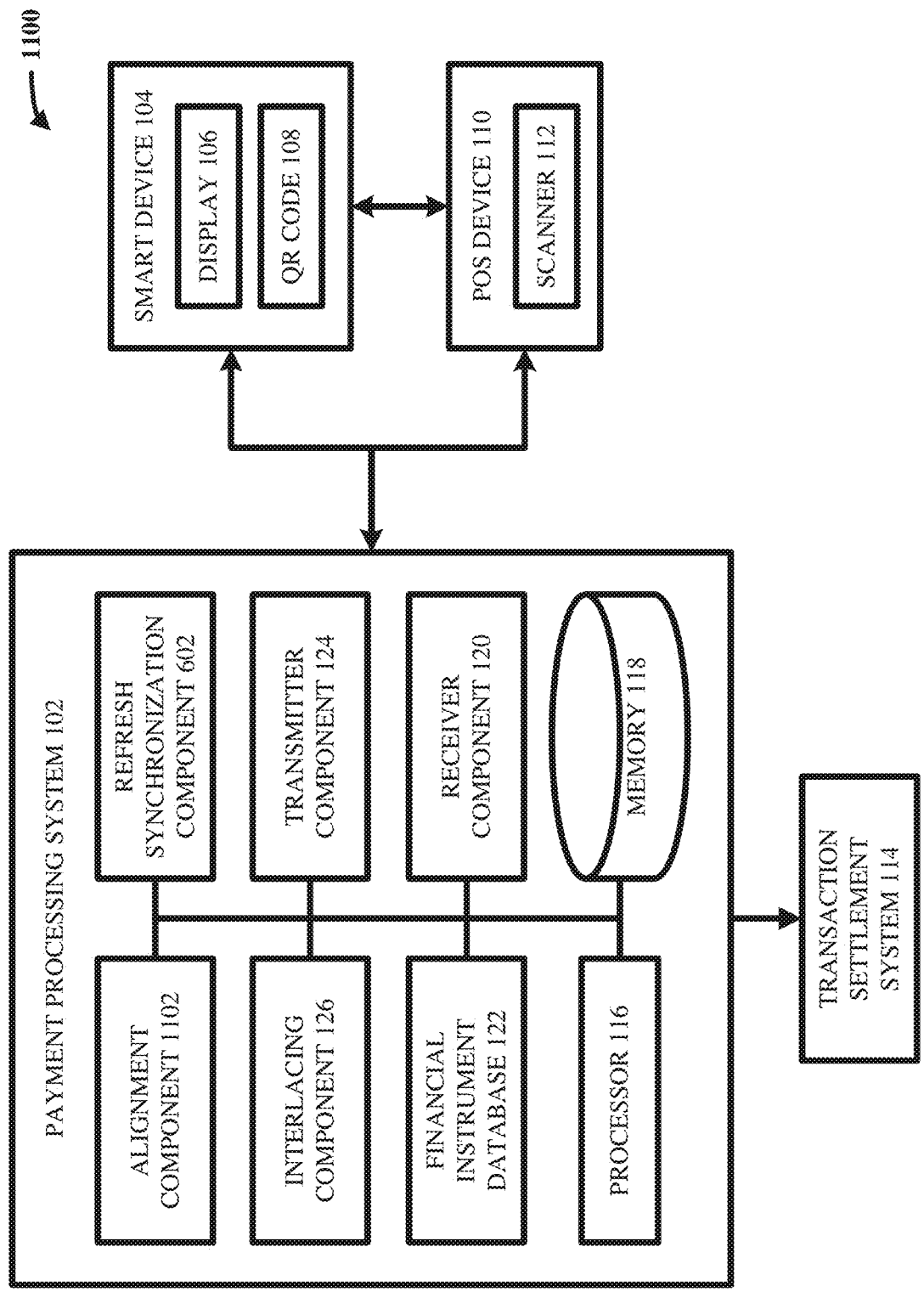
FIG. 11 illustrates a high-level block diagram of an example, non-limiting system including an alignment component that facilitates relay attack prevention for electronic QR codes via QR code alignment detection in accordance with one or more embodiments described herein.

FIG. 11 illustrates a high-level block diagram of an example, non-limiting system 1100 including an alignment component that can facilitate relay attack prevention for electronic QR codes via QR code alignment detection in accordance with one or more embodiments described herein. As shown, the system 1100 can, in some cases, comprise the same components as the system 600, and can further comprise an alignment component 1102.

In various embodiments, the alignment component 1102 can facilitate relay attack prevention via QR code alignment and/or misalignment detection. In various aspects, the smart device 104 can render the QR code 108 on the display 106. In various instances, the POS device 110 can scan the QR code 108 via the scanner 112, thereby generating a scanned image of the QR code 108. In various aspects, the scanned image of the QR code 108 can depict more than just the QR code 108. Indeed, in some cases, the scanned image of the QR code 108 can depict the smart device 104 (e.g., can depict the display 106 of the smart device 104). In various aspects, the POS device 110 can transmit the scanned image to the receiver component 120. In various instances, the alignment component 1102 can retrieve the scanned image from the receiver component 120 and can feed the scanned image into a trained machine learning model (not shown in FIG. 11). In various aspects, this can be separate and/or distinct from the machine learning classifier 704. Instead, the machine learning model of the alignment component 1102 can be trained and/or configured to receive as input the scanned image, to segment in the scanned image the physical edges and/or bevels of the smart device 104, to segment in the scanned image the edges of the QR code 108, and to determine as output whether the edges of the QR code 108 are aligned with (e.g., parallel to) the edges/bevels of the smart device 104.

In various cases, when an attacking device launches a relay attack, the attacking device is often forced to capture an image of the display 106 of the smart device 104 at an angle and/or from a slanted perspective (e.g., such angling is often required in order for the attacking entity to remain inconspicuous). This angling and/or slanted perspective can cause the edges of the QR code 108 to not be aligned and/or parallel with the edge/bevels of the attacking device when the attacking device renders the captured image of the QR code 108. Thus, in some cases, QR code misalignment detection can be leveraged to detect and/or ferret out relay attacks. Accordingly, if the machine learning model of the alignment component 1102 determines that the QR code 108 is aligned with the edges/bevels of the smart device 104, the payment processing system 102 can determine that the QR code 108 is not involved in a relay attack, and can subsequently transmit (e.g., via the transmitter component 124) payment information corresponding to the QR code 108 to the transaction settlement system 114. On the other hand, if the machine learning model of the alignment component 1102 determines that the QR code 108 is not aligned with the edges/bevels of the smart device 104, the payment processing system 102 can determine that the QR code 108 is involved in a relay attack, can refrain from transmitting payment information corresponding to the QR code 108 to the transaction settlement system 114, and/or can transmit (e.g., via the transmitter component 124) an unsuccessful validation/verification message to the POS device 110.

Figure 12:
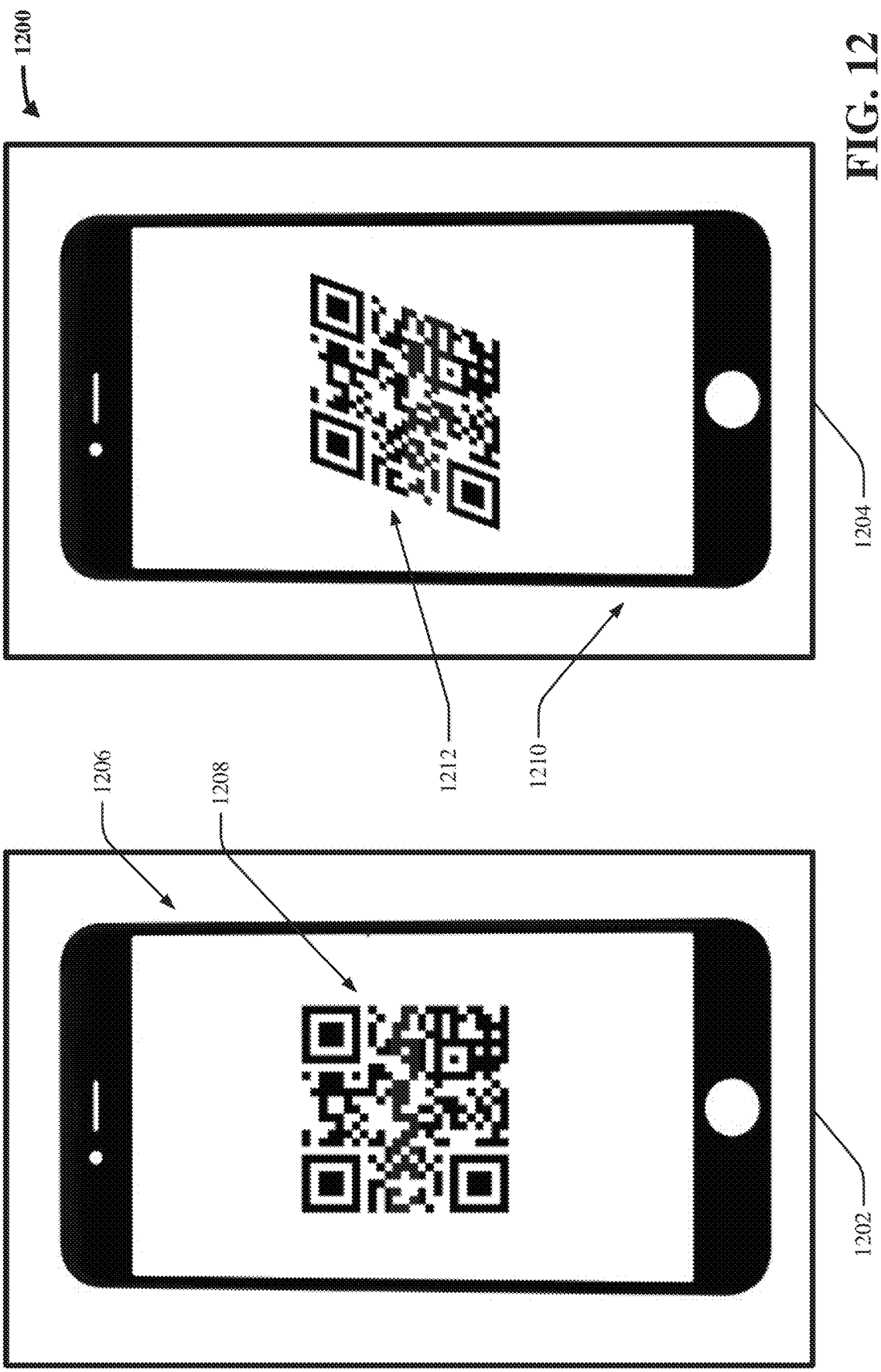
FIG. 12 illustrates, in an exemplary and non-limiting fashion, how QR code alignment can be used to facilitate relay attack prevention in accordance with one or more embodiments described herein.

FIG. 12 illustrates, in an exemplary and non-limiting fashion, how QR code alignment and/or misalignment can be used to facilitate relay attack prevention in accordance with one or more embodiments described herein.

As shown, FIG. 12 depicts an exemplary scanned image 1202 and an exemplary scanned image 1204, which can be considered as images that are generated/obtained by the POS device 110 after scanning. In various aspects, the scanned image 1202 can depict a QR code 1208 and can depict a smart device 1206 that rendered the QR code 1208. Similarly, the scanned image 1204 can depict a QR code 1212 and can depict a smart device 1210 that rendered the QR code 1212. As shown, the QR code 1208 is properly aligned with the smart device 1206 (e.g., the edges of the QR code 1208 are physically parallel to the edges and/or bevels of the smart device 1206). Thus, the machine learning model of the alignment component 1102 can analyze the scanned image 1202 and can determine that, because the QR code 1208 is aligned with the smart device 1206, the QR code 1208 is not involved in a relay attack (e.g., can determine that the smart device 1206 is not an attacking device). In contrast, as shown, the QR code 1212 is not properly aligned with the smart device 1210 (e.g., the edges of the QR code 1212 are not all physically parallel to the edges and/or bevels of the smart device 1210). Thus, the machine learning model of the alignment component 1102 can analyze the scanned image 1204 and can determine that, because the QR code 1212 is not aligned with the smart device 1210, the QR code 1212 is involved in a relay attack (e.g., can determine that the smart device 1210 is an attacking device).

Figure 13:
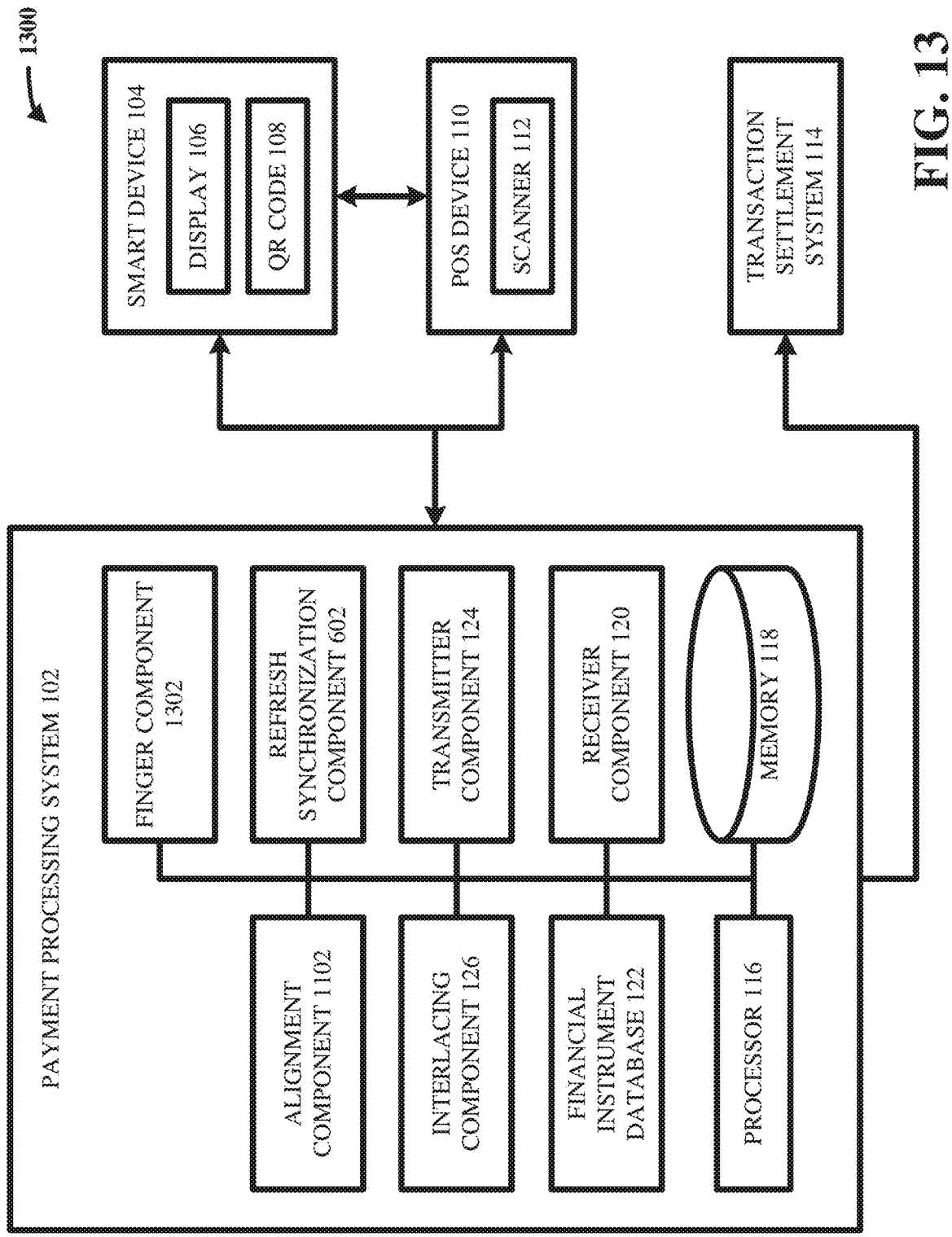
FIG. 13 illustrates a high-level block diagram of an example, non-limiting system including a finger component that facilitates relay attack prevention for electronic QR codes via finger detection in accordance with one or more embodiments described herein.

FIG. 13 illustrates a high-level block diagram of an example, non-limiting system 1300 including a finger component that can facilitate relay attack prevention for electronic QR codes via finger detection in accordance with one or more embodiments described herein. As shown, the system 1300 can, in some cases, comprise the same components as the system 1100, and can further comprise a finger component 1302.

In various embodiments, the finger component 1302 can facilitate relay attack prevention via excess finger detection and/or nested finger detection. In various aspects, the smart device 104 can render the QR code 108 on the display 106. In various instances, the POS device 110 can scan the QR code 108 via the scanner 112, thereby generating a scanned image of the QR code 108. In various aspects, the scanned image of the QR code 108 can depict more than just the QR code 108. Indeed, in some cases, the scanned image of the QR code 108 can depict the smart device 104 (e.g., can depict the display 106 of the smart device 104) and/or can depict fingers (and/or any other suitable anatomical structure) of the entity that is holding the smart device 104 as the smart device 104 is scanned by the POS device 110. In various aspects, the POS device 110 can transmit the scanned image to the receiver component 120. In various instances, the finger component 1302 can retrieve the scanned image from the receiver component 120 and can feed the scanned image into a trained machine learning model (not shown in FIG. 13). In various aspects, this can be separate and/or distinct from the machine learning classifier 704 and/or from the machine learning model of the alignment component 1102. Instead, the machine learning model of the finger component 1302 can be trained and/or configured to receive as input the scanned image, to segment in the scanned image the physical edges and/or bevels of the smart device 104, to segment in the scanned image human fingers that are depicted, and to determine as output whether the segmented fingers are located both inside and outside of the edges/bevels of the smart device 104.

In various cases, when an attacking device launches a relay attack, the attacking device often captures an image of not just the QR code 108 and the display 106 of the smart device 104, but also of the fingers of the entity that is holding the smart device 104 at the time of the image capture. Thus, when the attacking device subsequently renders the stolen/captured image of the QR code 108 on its own electronic display and is scanned by the POS device 110, the resulting scanned image generated/obtained by the POS device 110 can depict several important features, including: the QR code 108; fingers of the first entity (e.g., the true owner of the QR code 108) that were captured by the attacking device when the attacking device impermissibly captured an image of the QR code 108; the edges/bevels of the attacking device that were scanned/captured by the POS device 110 when the attacking device was presented for scanning; and fingers of the attacking entity (e.g., the attacking entity can be holding the attacking device when the attacking device is presented to the POS device 110 for scanning, and so the fingers of the attacking entity can be captured by the POS device 110). Overall, the result can be that the scanned image generated/obtained by the POS device 110 depicts nested fingers (e.g., fingers within fingers, and/or fingers both inside and outside of the edges/bevels of the attacking device). If no relay attack is attempted, however, the scanned image generated/obtained by the POS device 110 would not depict such nested fingers (e.g., such a scanned image would depict the QR code 108, the edges/bevels of the smart device 104, and the fingers of the entity holding the smart device 104 as the smart device 104 is scanned by the POS device 110). Therefore, in some cases, excess finger detection and/or nested finger detection can be leveraged to detect and/or ferret out relay attacks. Accordingly, if the machine learning model of the finger component 1302 determines that the scanned image does not depict fingers both inside of and outside of the edges/bevels of the smart device 104, the payment processing system 102 can determine that the QR code 108 is not involved in a relay attack, and can subsequently transmit (e.g., via the transmitter component 124) payment information corresponding to the QR code 108 to the transaction settlement system 114. On the other hand, if the machine learning model of the finger component 1302 determines that the scanned image depicts fingers both inside of and outside of the edges/bevels of the smart device 104, the payment processing system 102 can determine that the QR code 108 is involved in a relay attack, can refrain from transmitting payment information corresponding to the QR code 108 to the transaction settlement system 114, and/or can transmit (e.g., via the transmitter component 124) an unsuccessful validation/verification message to the POS device 110.

Figure 14:
FIGS. 14-15 illustrate, in exemplary and non-limiting fashions, how finger detection can be used to facilitate relay attack prevention in accordance with one or more embodiments described herein.
Figure 15:
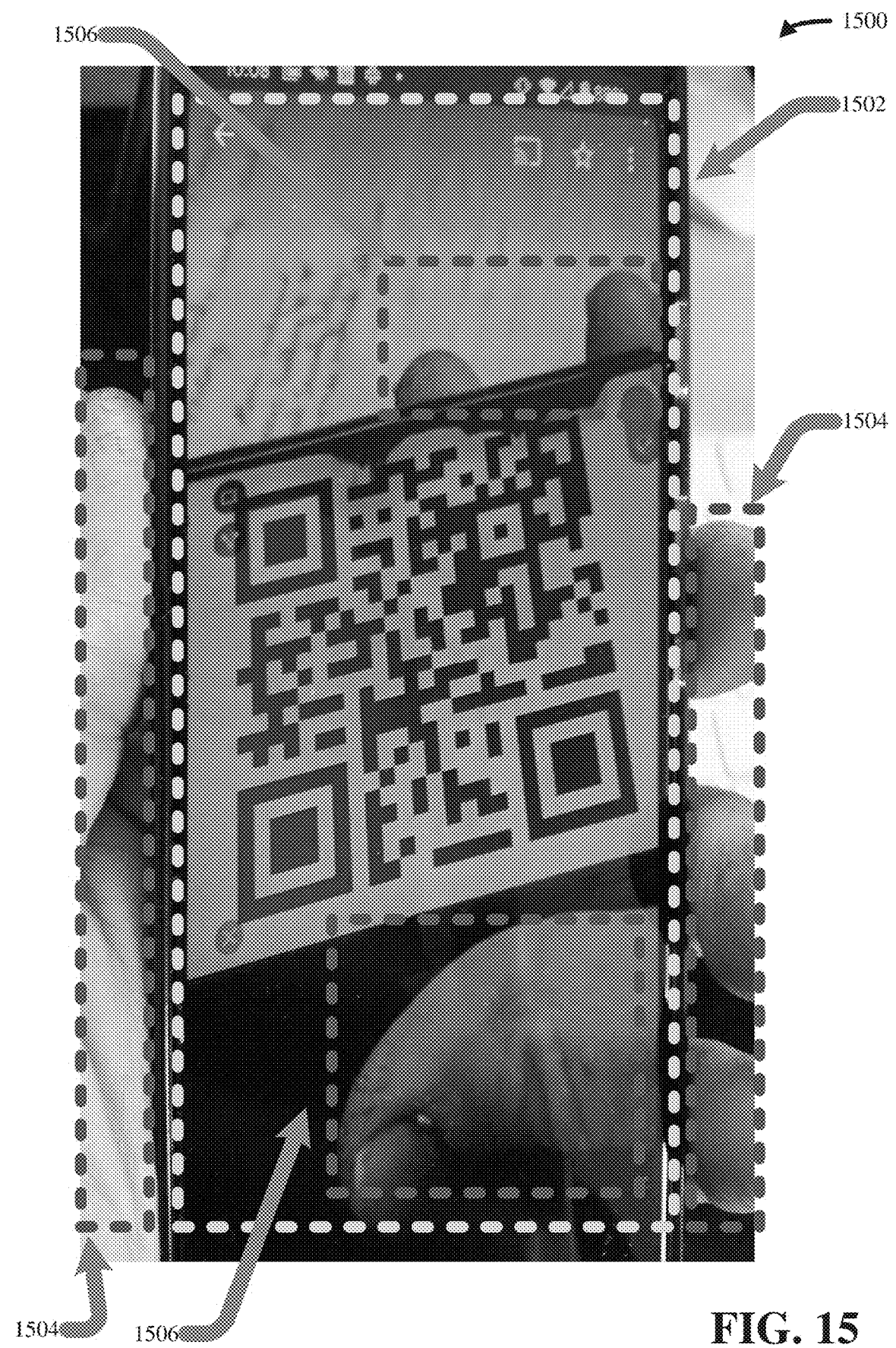

FIGS. 14-15 illustrate, in exemplary and non-limiting fashions, how excess finger detection and/or nested finger detection can be used to facilitate relay attack prevention in accordance with one or more embodiments described herein.

FIG. 14 simply shows an exemplary and non-limiting scanned image 1400 that can be generated and/or obtained by the POS device 110 after scanning. As shown, and going from the periphery to the center, the scanned image 1400 depicts the hand/fingers of an attacking entity, depicts the attacking device being held in the hand/fingers of the attacking entity, and depicts an image rendered on the attacking device. As shown, the image rendered on the attacking device itself depicts the hand/fingers of a relay attack victim, depicts a smart device being held in the hand/fingers of the relay attack victim, and depicts a QR code rendered on the smart device of the relay attack victim. In other words, the scanned image 1400 exhibits excess and/or nested fingers as described above. This is more easily seen in FIG. 15.

FIG. 15 can be considered as an annotated version of FIG. 14. So, the scanned image 1500 can be considered as an annotated version of the scanned image 1400. As shown, FIG. 15 illustrates various exemplary bounding boxes superimposed on the scanned image 1500 that highlight and/or callout features of interest in the scanned image 1500. Specifically, the bounding box 1502 (yellow) demarcates the edges and/or bevels of the attacking device. Moreover, the bounding boxes 1504 (red) demarcate the fingers of the attacking entity (e.g., the fingers of the entity that is holding the attacking device). Furthermore, the bounding boxes 1506 (red) demarcate the fingers of the relay attack victim (e.g., the fingers of the entity whose QR code was stolen/captured by the attacking device). As shown, the bounding boxes 1504 are outside of the bounding box 1502. As also shown, the bounding boxes 1506 are inside of the bounding box 1502. That is, the scanned image 1500 depicts nested fingers as described above. In various cases, the machine learning model of the finger component 1302 can be trained/configured to detect and/or segment in a scanned image the edge/bevels of the device being scanned (e.g., denoted by 1502) and any fingers (e.g., denoted by 1504 and 1506). If the machine learning model of the finger component 1302 determines the scanned image include fingers both inside and outside of the edges/bevels of the device being scanned, the payment processing system 102 can determine that a relay attack is afoot.

Figure 16:
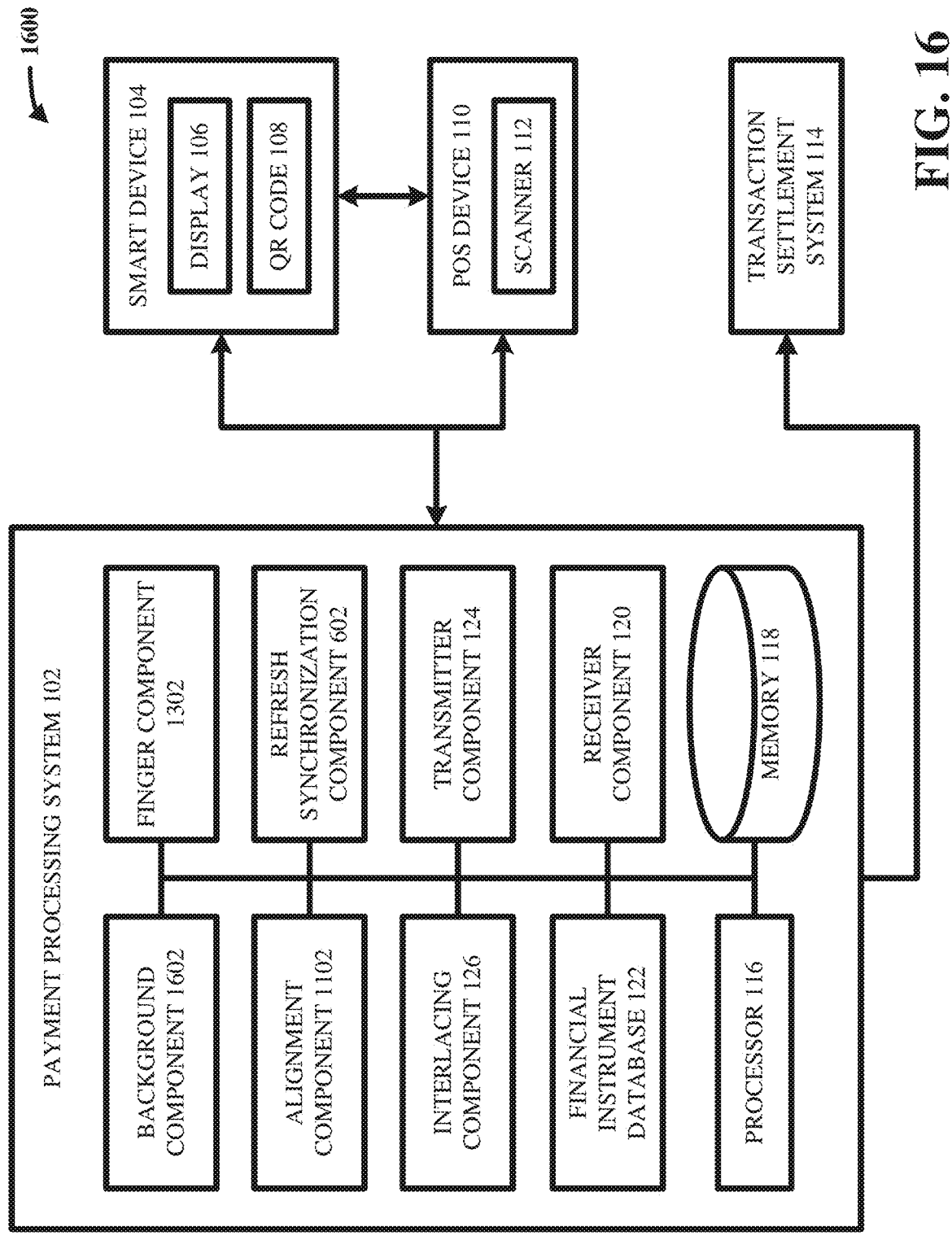
FIG. 16 illustrates a high-level block diagram of an example, non-limiting system including a background component that facilitates relay attack prevention for electronic QR codes via background detection in accordance with one or more embodiments described herein.

FIG. 16 illustrates a high-level block diagram of an example, non-limiting system 1600 including a background component that can facilitate relay attack prevention for electronic QR codes via background detection in accordance with one or more embodiments described herein. As shown, the system 1600 can, in some cases, comprise the same components as the system 1300, and can further comprise a background component 1602.

In various embodiments, the background component 1602 can facilitate relay attack prevention via predetermined background detection. In various aspects, the smart device 104 can render the QR code 108 on the display 106. In various instances, the POS device 110 can scan the QR code 108 via the scanner 112, thereby generating a scanned image of the QR code 108. In various aspects, the scanned image of the QR code 108 can depict more than just the QR code 108. Indeed, in some cases, the scanned image of the QR code 108 can depict an electronically generated background that is rendered on the display 106 simultaneously with the QR code 108. In various aspects, the POS device 110 can transmit the scanned image to the receiver component 120. In various instances, the background component 1602 can retrieve the scanned image from the receiver component 120 and can feed the scanned image into a trained machine learning model (not shown in FIG. 16). In various aspects, this can be separate and/or distinct from the machine learning classifier 704, from the machine learning model of the alignment component 1102, and/or from the machine learning model of the finger component 1302. Instead, the machine learning model of the background component 1602 can be trained and/or configured to receive as input the scanned image, to segment in the scanned image the physical edges and/or bevels of the device being scanned by the POS device 110, to segment in the scanned image the QR code 108, and to determine as output whether a predetermined background object and/or pattern is depicted between the edges/bevels of the device being scanned and the QR code 108. If the background objects/patterns that are actually depicted in the scanned image as being between the edges/bevels of the device being scanned and the QR code 108 are not as expected (e.g., differ from a predetermined background by more than a threshold margin), the payment processing system 102 can determine that the QR code 108 is involved in a relay attack. In various instances, any suitable predetermined background object/pattern can be implemented (e.g., paisley pattern, electronic watermarks, and/or so on).

For example, suppose that the predetermined background is an unbroken paisley pattern between the QR code 108 and the edges/bevels of the smart device 104. If no relay attack is attempted, the smart device 104 can render the QR code 108 with the unbroken paisley background, the POS device 110 can scan/capture the smart device 104, thereby yielding a scanned image that depicts the edges/bevels of the smart device 104, the QR code 108, and the unbroken paisley background, and the POS device 110 can transmit the scanned image to the payment processor. Accordingly, the background component 1602, via execution of a machine learning model, can determine that the area between the QR code 108 and the edges/bevels of the smart device 104 is filled with an unbroken paisley background as expected, can determine that the QR code 108 is thus not involved in a relay attack, and can transmit payment information corresponding to the QR code 108 to the transaction settlement system 114. On the other hand, if a relay attack is attempted, the attacking device can impermissibly capture/steal an image of the QR code 108 as rendered on the display 106 of the smart device 104. Importantly, this captured/stolen image can depict the QR code 108 and the paisley background rendered on the smart device 104, but can also depict various other background objects that are not a paisley background (e.g., can capture the edges/bevels of the smart device 104, clothing of the entity that is holding the smart device 104, fingers and/or anatomical structures of the entity holding the smart device 104, furniture in the room where the impermissible image capture occurred, and/or so on). In various cases, the attacking device can subsequently render the captured/stolen image on its own electronic display, the POS device 110 can scan the attacking device, thereby yielding a scanned image that depicts the edges/bevels of the attacking device, the QR code 108, the unbroken paisley background, and the various other background objects that are not a paisley background, and the POS device 110 can transmit the scanned image to the payment processor. Accordingly, the background component 1602, via execution of a machine learning model, can determine that the area between the QR code 108 and the edges/bevels of the attacking device (e.g., the device being scanned) is not filled with an unbroken paisley pattern as expected (e.g., that area can instead be filled with a partial paisley pattern that was rendered by the smart device 104, the edges/bevels of the smart device 104, the clothing and/or anatomical structures of the entity holding the smart device 104, furniture, and/or so on). Thus, the payment processing system 102 can determine that the QR code 108 is involved in a relay attack and can refrain from transmitting payment information corresponding to the QR code 108 to the transaction settlement system 114.

Figure 17:
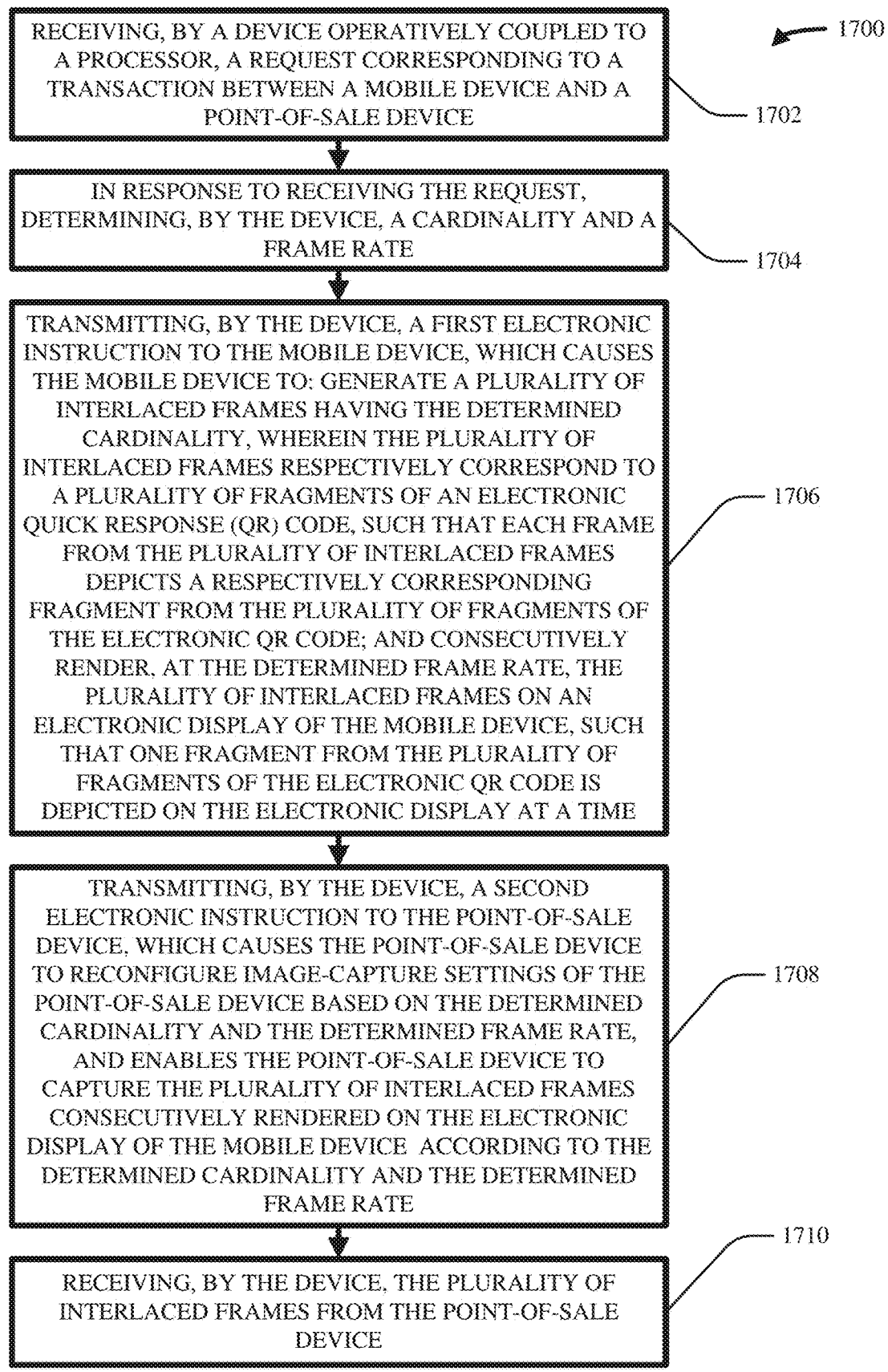
FIG. 17 illustrates a high-level flow diagram of an example, non-limiting computer-implemented method that facilitates relay attack prevention for electronic QR codes via frame interlacing in accordance with one or more embodiments described herein.

FIG. 17 illustrates a high-level flow diagram of an example, non-limiting computer-implemented method 1700 that can facilitate relay attack prevention for electronic QR codes via frame interlacing in accordance with one or more embodiments described herein.

In various embodiments, act 1702 can include receiving, by a device operatively coupled to a processor (e.g., 120), a request (e.g., 504) corresponding to a transaction between a mobile device (e.g., 104) and a point-of-sale device (e.g., 110).

In various aspects, act 1704 can include, in response to receiving the request, determining, by the device (e.g., 126) a cardinality (e.g., 202) and a frame rate (e.g., 204).

In various instances, act 1706 can include transmitting, by the device (e.g., 124), a first electronic instruction (e.g., 510) to the mobile device, which can cause the mobile device to generate a plurality of interlaced frames (e.g., 208) having the determined cardinality. In various cases, the plurality of interlaced frames can respectively correspond to a plurality of fragments (e.g., 206) of an electronic quick response (QR) code (e.g., 108). This can cause each frame from the plurality of interlaced frames to depict a respectively corresponding fragment from the plurality of fragments of the electronic QR code. Moreover, the first electronic instruction can further cause the mobile device to consecutively render, at the determined frame rate, the plurality of interlaced frames on an electronic display (e.g., 106) of the mobile device. This can cause one fragment from the plurality of fragments of the electronic QR code to be depicted on the electronic display at a time.

In various embodiments, act 1708 can include transmitting, by the device (e.g., 124), a second electronic instruction (e.g., 508) to the point-of-sale device, which can cause the point-of-sale device to reconfigure image-capture settings of the point-of-sale device based on the determined cardinality and/or the determined frame rate. In various cases, this can further cause the point-of-sale device to capture and/or scan the plurality of interlaced frames that are consecutively rendered on the electronic display according to the determined cardinality and/or the determined frame rate.

In various aspects, act 1710 can include receiving, by the device (e.g., 120), the plurality of interlaced frames from the point-of-sale device.

Figure 18:
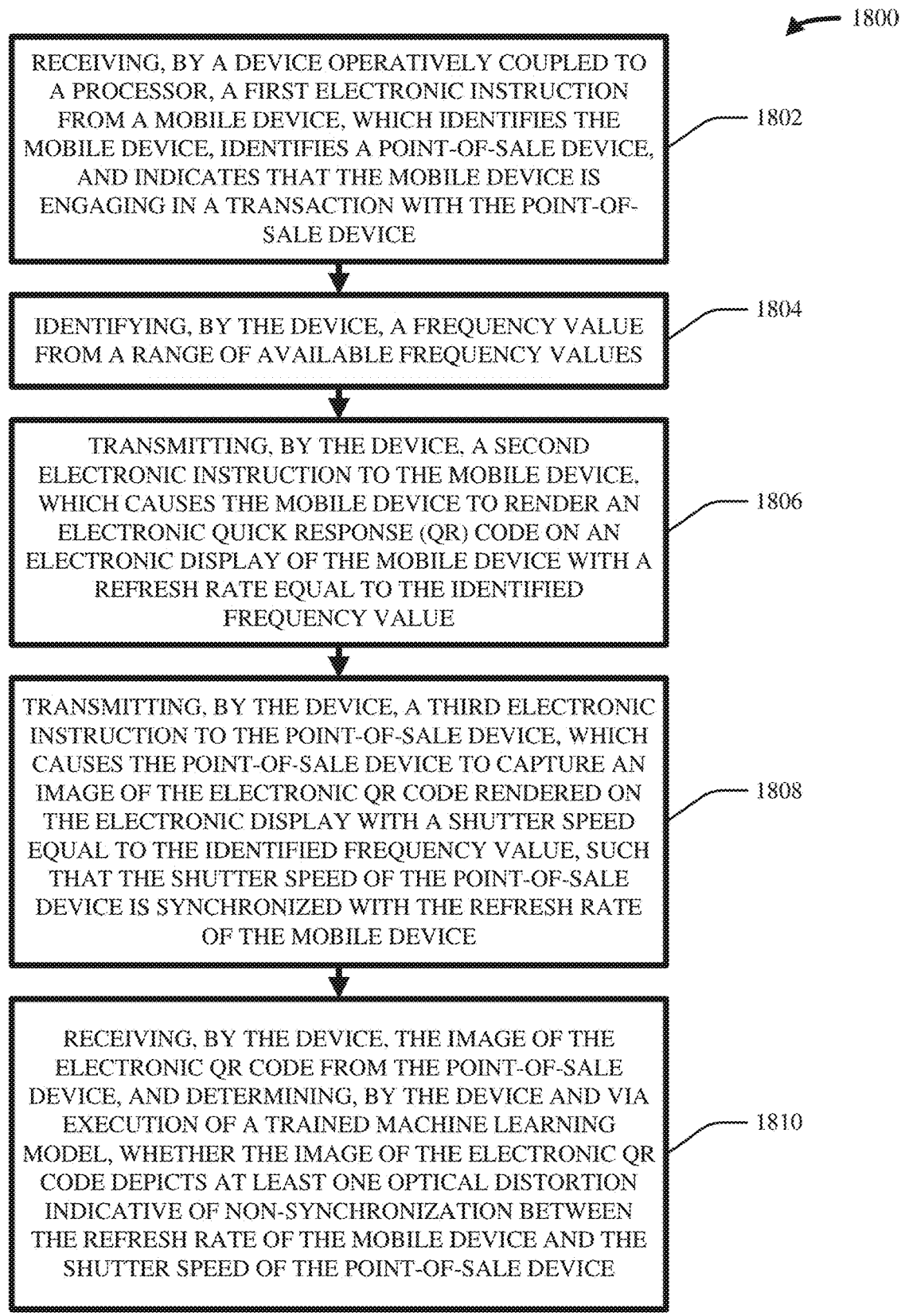
FIG. 18 illustrates a high-level flow diagram of an example, non-limiting computer-implemented method that facilitates relay attack prevention for electronic QR codes via refresh rate synchronization in accordance with one or more embodiments described herein.

FIG. 18 illustrates a high-level flow diagram of an example, non-limiting computer-implemented method 1800 that can facilitate relay attack prevention for electronic QR codes via refresh rate synchronization in accordance with one or more embodiments described herein.

In various embodiments, act 1802 can include receiving, by a device operatively coupled to a processor (e.g., 120), a first electronic instruction (e.g., 904) from a mobile device (e.g., 104). In various cases, the first electronic instruction can identify the mobile device, can identify a point-of-sale device (e.g., 110), and can indicate that the mobile device is engaging in a transaction with the point-of-sale device.

In various instances, act 1804 can include identifying, by the device (e.g., 602), a frequency value (e.g., 702) from a range of available frequency values.

In various aspects, act 1806 can include transmitting, by the device (e.g., 124), a second electronic instruction (e.g., 910) to the mobile device, which can cause the mobile device to render an electronic quick response (QR) code (e.g., 108) on an electronic display (e.g., 106) of the mobile device with a refresh rate (e.g., 706) that is equal to the identified frequency value.

In various embodiments, act 1808 can include transmitting, by the device (e.g., 124), a third electronic instruction (e.g., 908) to the point-of-sale device, which can cause the point-of-sale device to capture an image of the electronic QR code rendered on the electronic display with a shutter speed (e.g., 708) equal to the identified frequency value. In various cases, this can cause the shutter speed of the point-of-sale device to be synchronized with the refresh rate of the mobile device.

In various instances, act 1810 can include receiving, by the device (e.g., 120), the image of the electronic QR code from the point-of-sale device, and determining, by the device (e.g., 602) and via a trained machine learning model (e.g., 704), whether the image of the electronic QR code depicts at least one optical distortion (e.g., 806) indicative of non-synchronization between the refresh rate of the mobile device and the shutter speed of the point-of-sale device.

As explained above, various embodiments of the subject innovation can incorporate artificial intelligence algorithms and/or machine learning models (e.g., machine learning classifier 704, the machine learning model of the alignment component 1102, the machine learning model of the finger component 1302, and/or the machine learning model of the background component 1602) to perform and/or facilitate various image-analysis functionalities. In various aspects, however, any suitable non-machine-learning and/or non-artificial intelligence techniques can be implemented to facilitate the various image-analysis functionalities described herein.

Figure 19:
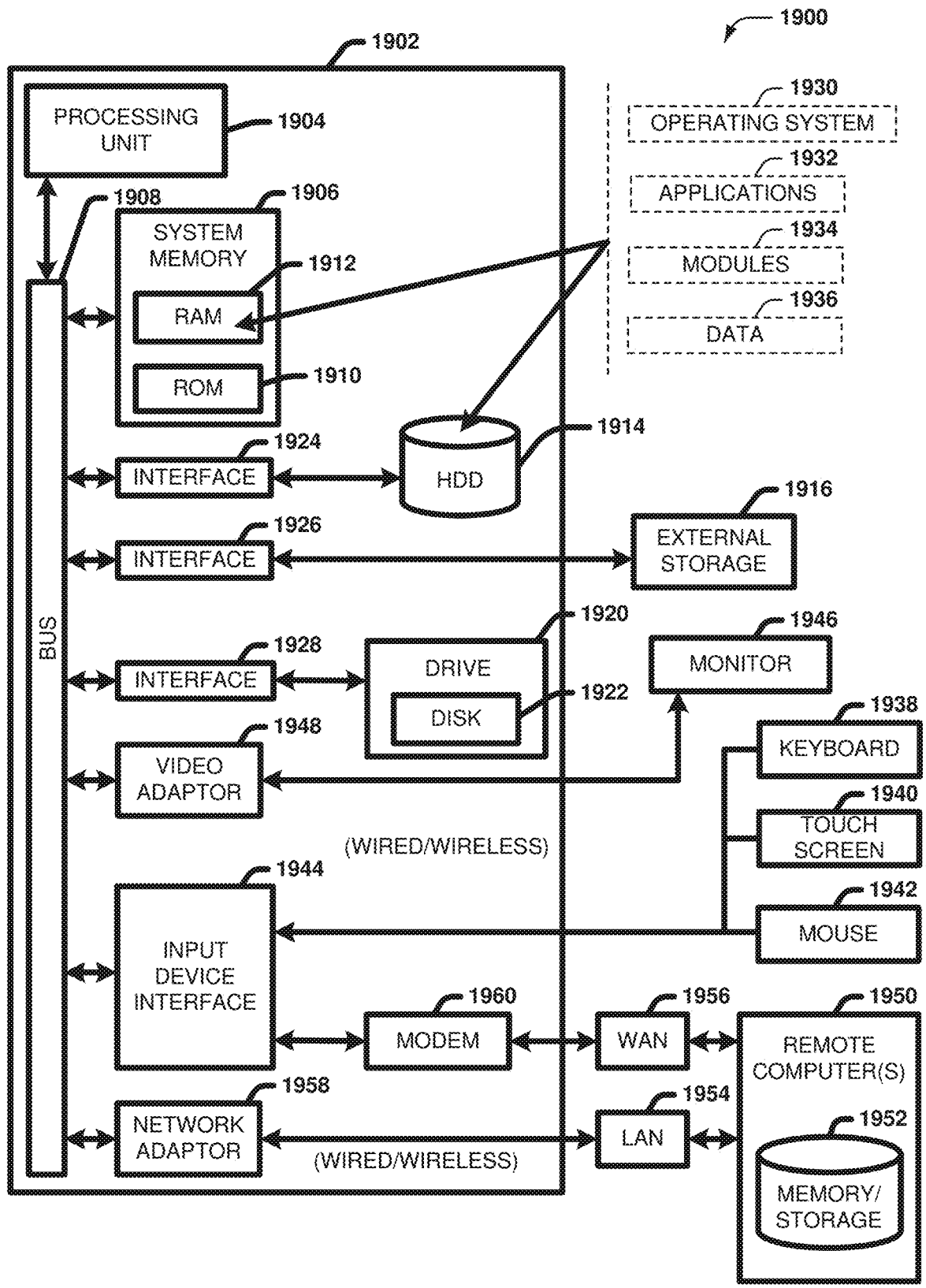
FIG. 19 illustrates a block diagram of an example, non-limiting operating environment in which one or more embodiments described herein can be facilitated.

In order to provide additional context for various embodiments described herein, FIG. 19 and the following discussion are intended to provide a brief, general description of a suitable computing environment 1900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 19, the example environment 1900 for implementing various embodiments of the aspects described herein includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 can be any of various commercially available processors. Dual microprocessors and other multi-processor architectures can also be employed as the processing unit 1904.

The system bus 1908 can be any of several types of bus structure that can further interconnect to a memory bus (with or without a memory controller), a peripheral bus, and a local bus using any of a variety of commercially available bus architectures. The system memory 1906 includes ROM 1910 and RAM 1912. A basic input/output system (BIOS) can be stored in a non-volatile memory such as ROM, erasable programmable read only memory (EPROM), EEPROM, which BIOS contains the basic routines that help to transfer information between elements within the computer 1902, such as during startup. The RAM 1912 can also include a high-speed RAM such as static RAM for caching data.

The computer 1902 further includes an internal hard disk drive (HDD) 1914 (e.g., EIDE, SATA), one or more external storage devices 1916 (e.g., a magnetic floppy disk drive (FDD) 1916, a memory stick or flash drive reader, a memory card reader, etc.) and a drive 1920, e.g., such as a solid state drive, an optical disk drive, which can read or write from a disk 1922, such as a CD-ROM disc, a DVD, a BD, etc. Alternatively, where a solid state drive is involved, disk 1922 would not be included, unless separate. While the internal HDD 1914 is illustrated as located within the computer 1902, the internal HDD 1914 can also be configured for external use in a suitable chassis (not shown). Additionally, while not shown in environment 1900, a solid state drive (SSD) could be used in addition to, or in place of, an HDD 1914. The HDD 1914, external storage device(s) 1916 and drive 1920 can be connected to the system bus 1908 by an HDD interface 1924, an external storage interface 1926 and a drive interface 1928, respectively. The interface 1924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912. The systems and methods described herein can be implemented utilizing various commercially available operating systems or combinations of operating systems.

Computer 1902 can optionally comprise emulation technologies. For example, a hypervisor (not shown) or other intermediary can emulate a hardware environment for operating system 1930, and the emulated hardware can optionally be different from the hardware illustrated in FIG. 19. In such an embodiment, operating system 1930 can comprise one virtual machine (VM) of multiple VMs hosted at computer 1902. Furthermore, operating system 1930 can provide runtime environments, such as the Java runtime environment or the .NET framework, for applications 1932. Runtime environments are consistent execution environments that allow applications 1932 to run on any operating system that includes the runtime environment. Similarly, operating system 1930 can support containers, and applications 1932 can be in the form of containers, which are lightweight, standalone, executable packages of software that include, e.g., code, runtime, system tools, system libraries and settings for an application.

Further, computer 1902 can be enable with a security module, such as a trusted processing module (TPM). For instance with a TPM, boot components hash next in time boot components, and wait for a match of results to secured values, before loading a next boot component. This process can take place at any layer in the code execution stack of computer 1902, e.g., applied at the application execution level or at the operating system (OS) kernel level, thereby enabling security at any level of code execution.

A user can enter commands and information into the computer 1902 through one or more wired/wireless input devices, e.g., a keyboard 1938, a touch screen 1940, and a pointing device, such as a mouse 1942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1904 through an input device interface 1944 that can be coupled to the system bus 1908, but can be connected by other interfaces, such as a parallel port, an IEEE 1394 serial port, a game port, a USB port, an IR interface, a BLUETOOTH® interface, etc.

A monitor 1946 or other type of display device can be also connected to the system bus 1908 via an interface, such as a video adapter 1948. In addition to the monitor 1946, a computer typically includes other peripheral output devices (not shown), such as speakers, printers, etc.

The computer 1902 can operate in a networked environment using logical connections via wired and/or wireless communications to one or more remote computers, such as a remote computer(s) 1950. The remote computer(s) 1950 can be a workstation, a server computer, a router, a personal computer, portable computer, microprocessor-based entertainment appliance, a peer device or other common network node, and typically includes many or all of the elements described relative to the computer 1902, although, for purposes of brevity, only a memory/storage device 1952 is illustrated. The logical connections depicted include wired/wireless connectivity to a local area network (LAN) 1954 and/or larger networks, e.g., a wide area network (WAN) 1956. Such LAN and WAN networking environments are commonplace in offices and companies, and facilitate enterprise-wide computer networks, such as intranets, all of which can connect to a global communications network, e.g., the Internet.

When used in a LAN networking environment, the computer 1902 can be connected to the local network 1954 through a wired and/or wireless communication network interface or adapter 1958. The adapter 1958 can facilitate wired or wireless communication to the LAN 1954, which can also include a wireless access point (AP) disposed thereon for communicating with the adapter 1958 in a wireless mode.

When used in a WAN networking environment, the computer 1902 can include a modem 1960 or can be connected to a communications server on the WAN 1956 via other means for establishing communications over the WAN 1956, such as by way of the Internet. The modem 1960, which can be internal or external and a wired or wireless device, can be connected to the system bus 1908 via the input device interface 1944. In a networked environment, program modules depicted relative to the computer 1902 or portions thereof, can be stored in the remote memory/storage device 1952. It will be appreciated that the network connections shown are example and other means of establishing a communications link between the computers can be used.

When used in either a LAN or WAN networking environment, the computer 1902 can access cloud storage systems or other network-based storage systems in addition to, or in place of, external storage devices 1916 as described above, such as but not limited to a network virtual machine providing one or more aspects of storage or processing of information. Generally, a connection between the computer 1902 and a cloud storage system can be established over a LAN 1954 or WAN 1956 e.g., by the adapter 1958 or modem 1960, respectively. Upon connecting the computer 1902 to an associated cloud storage system, the external storage interface 1926 can, with the aid of the adapter 1958 and/or modem 1960, manage storage provided by the cloud storage system as it would other types of external storage. For instance, the external storage interface 1926 can be configured to provide access to cloud storage sources as if those sources were physically connected to the computer 1902.

The computer 1902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 20:
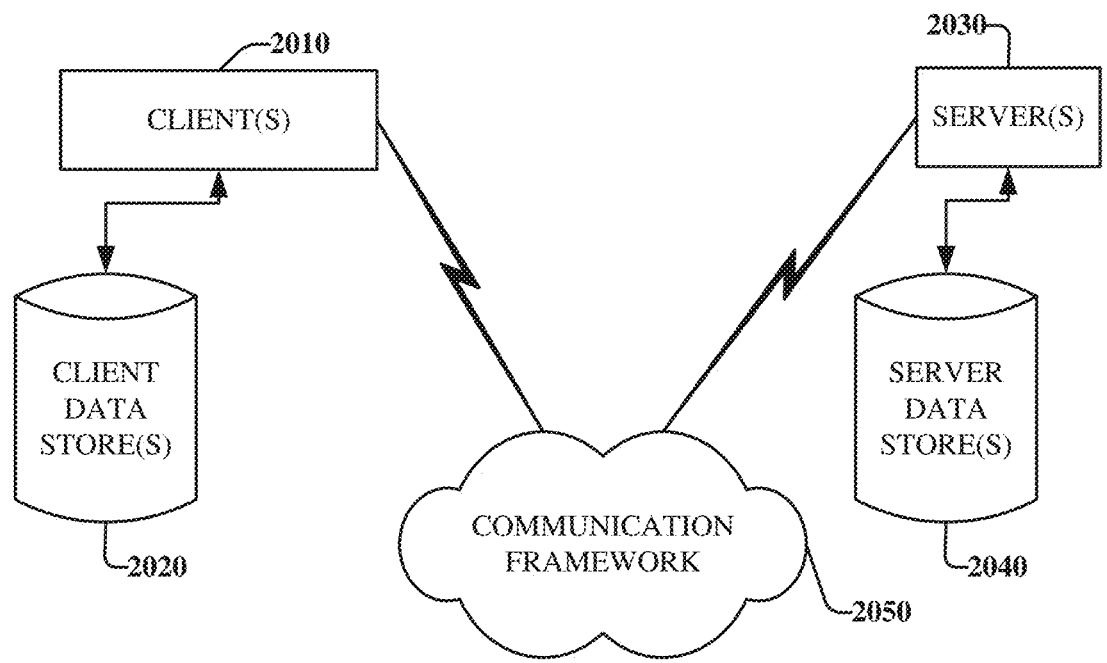
FIG. 20 illustrates an example networking environment operable to execute various implementations described herein.

FIG. 20 is a schematic block diagram of a sample computing environment 2000 with which the disclosed subject matter can interact. The sample computing environment 2000 includes one or more client(s) 2010. The client(s) 2010 can be hardware and/or software (e.g., threads, processes, computing devices). The sample computing environment 2000 also includes one or more server(s) 2030. The server(s) 2030 can also be hardware and/or software (e.g., threads, processes, computing devices). The servers 2030 can house threads to perform transformations by employing one or more embodiments as described herein, for example. One possible communication between a client 2010 and a server 2030 can be in the form of a data packet adapted to be transmitted between two or more computer processes. The sample computing environment 2000 includes a communication framework 2050 that can be employed to facilitate communications between the client(s) 2010 and the server(s) 2030. The client(s) 2010 are operably connected to one or more client data store(s) 2020 that can be employed to store information local to the client(s) 2010. Similarly, the server(s) 2030 are operably connected to one or more server data store(s) 2040 that can be employed to store information local to the servers 2030.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A payment processing system, comprising:
  a processor that executes computer-executable instructions stored in a memory, which causes the processor to:
    determine a cardinality and a frame rate;
    transmit a first electronic instruction to a mobile device, which causes the mobile device to:
      generate a set of interlaced frames having the determined cardinality,
        wherein the set of interlaced frames respectively correspond to a set of portions of an electronic quick response (QR) code, such that different frames from the set of interlaced frames depict different portions from the set of portions of the electronic QR code, and
      sequentially render, at the determined frame rate, the set of interlaced frames on an electronic display of the mobile device, such that one portion from the set of portions of the electronic QR code is depicted on the electronic display at a time; and
    transmit a second electronic instruction to a point-of-sale device,
      wherein the second electronic instruction comprises an indicator of the determined cardinality;
      wherein the second electronic instruction is configured to cause the point-of-sale device to synchronize scanner settings of the point-of-sale device with the determined cardinality and with the determined frame rate based on the indicator of the determined cardinality, and
      wherein the second electronic instruction is further configured to enable the point-of-sale device to capture the set of interlaced frames sequentially rendered on the electronic display of the mobile device.

2. The payment processing system of claim 1, wherein the computer-executable instructions are further executable to cause the processor to:
  receive from the point-of-sale device the set of interlaced frames.

3. The payment processing system of claim 2, wherein the computer-executable instructions are further executable to cause the processor to:
  construct an entirety of the electronic QR code based on the set of interlaced frames; and
  identify payment information corresponding to the electronic QR code.

4. The payment processing system of claim 3, wherein the processor constructs the entirety of the electronic QR code by superimposing the set of interlaced frames on top of each other.

5. The payment processing system of claim 3, wherein the computer-executable instructions are further executable to cause the processor to:
  transmit the payment information corresponding to the electronic QR code to a transaction settlement system for settlement.

6. The payment processing system of claim 1, wherein sequentially rendering the set of interlaced frames on the electronic display prevents an attacking device from capturing an entirety of the electronic QR code in a captured image of the electronic display.

7. The payment processing system of claim 1, wherein sequentially rendering the set of interlaced frames on the electronic display causes an entirety of the electronic QR code to be visually perceptible to a user of the mobile device.

8. A computer-implemented method, comprising:
  receiving, by a device operatively coupled to a processor, a request corresponding to a transaction between a mobile device and a point of sale device;
  in response to receiving the request, determining, by the device, a cardinality and a frame rate;
  transmitting, by the device, a first electronic instruction to the mobile device, which causes the mobile device to:
    generate a plurality of interlaced frames having the determined cardinality,
      wherein the plurality of interlaced frames respectively correspond to a plurality of fragments of an electronic quick response (QR) code, such that each frame from the plurality of interlaced frames depicts a respectively corresponding fragment from the plurality of fragments of the electronic QR code; and
    consecutively render, at the determined frame rate, the plurality of interlaced frames on an electronic display of the mobile device, such that one fragment from the plurality of fragments of the electronic QR code is depicted on the electronic display at a time; and
  transmitting, by the device, a second electronic instruction to the point-of-sale device,
    wherein the second electronic instruction comprises an indicator of the determined cardinality,
    wherein the second electronic instruction is configured to cause the point-of-sale device to synchronize image-capture settings of the point-of-sale device with the determined cardinality and with the determined frame rate based on the indicator of the determined cardinality, and
    wherein the second electronic instruction is further configured to enable the point-of-sale device to capture the plurality of interlaced frames consecutively rendered on the electronic display of the mobile device.

9. The computer-implemented method of claim 8, further comprising:

receiving, by the device, the plurality of interlaced frames from the point-of-sale device.

10. The computer-implemented method of claim 9, further comprising:
assembling, by the device, an entirety of the electronic QR code based on the plurality of interlaced frames; and
identifying, by the device, financial instrument information corresponding to the electronic QR code.

11. The computer-implemented method of claim 10, wherein the assembling the entirety of the electronic QR code is facilitated by superimposing, by the device, the plurality of interlaced frames on top of one another.

12. The computer-implemented method of claim 10, further comprising:
transmitting, by the device, the financial instrument information corresponding to the electronic QR code to a transaction settlement system for settlement.

13. The computer-implemented method of claim 8, wherein the consecutively rendering the plurality of interlaced frames on the electronic display prevents an attacking device from capturing an entirety of the electronic QR code in a captured image of the electronic display.

14. The computer-implemented method of claim 8, wherein the consecutively rendering the plurality of interlaced frames on the electronic display causes an entirety of the electronic QR code to be visually perceptible to a user of the mobile device.

15. A non-transitory computer-readable medium comprising instructions which, when executed by a computer, cause the computer to carry out the steps of:
determining a cardinality and a frame rate;
transmitting a first electronic instruction to a mobile device, which causes the mobile device to:
generate a set of interlaced frames having the determined cardinality,
wherein the set of interlaced frames respectively correspond to a set of portions of an electronic quick response (QR) code, such that different frames from the set of interlaced frames depict different portions from the set of portions of the electronic QR code, and
sequentially render, at the determined frame rate, the set of interlaced frames on an electronic display of the mobile device, such that one portion from the set of portions of the electronic QR code is depicted on the electronic display at a time; and
transmit a second electronic instruction to a point-of-sale device,
wherein the second electronic instruction comprises an indicator of the determined cardinality;
wherein the second electronic instruction is configured to cause the point-of-sale device to synchronize scanner settings of the point-of-sale device with the determined cardinality and with the determined frame rate based on the indicator of the determined cardinality, and
wherein the second electronic instruction is further configured to enable the point-of-sale device to capture the set of interlaced frames sequentially rendered on the electronic display of the mobile device.

16. The non-transitory computer-readable medium of claim 15, wherein the computer-executable instructions are further executable to cause the computer to:
receive from the point-of-sale device the set of interlaced frames.

17. The non-transitory computer-readable medium of claim 16, wherein the computer-executable instructions are further executable to cause the computer to:
construct an entirety of the electronic QR code based on the set of interlaced frames; and
identify payment information corresponding to the electronic QR code.

18. The non-transitory computer-readable medium of claim 17, wherein the processor constructs the entirety of the electronic QR code by superimposing the set of interlaced frames on top of each other.

19. The non-transitory computer-readable medium of claim 17, wherein the computer-executable instructions are further executable to cause the computer to:
transmit the payment information corresponding to the electronic QR code to a transaction settlement system for settlement.

20. The non-transitory computer-readable medium of claim 15, wherein sequentially rendering the set of interlaced frames on the electronic display prevents an attacking device from capturing an entirety of the electronic QR code in a captured image of the electronic display.

* * * * *